United States Patent
Kikuchi

(10) Patent No.: US 10,333,415 B2
(45) Date of Patent: Jun. 25, 2019

(54) INSULATED SYNCHRONOUS RECTIFICATION DC/DC CONVERTER INCLUDING SYNCHRONOUS RECTIFICATION CONTROLLER CONTROLLING SYNCHRONOUS RECTIFICATION TRANSISTOR

(71) Applicant: ROHM CO., LTD., Ukyo-ku, Kyoto (JP)

(72) Inventor: Hiroki Kikuchi, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/638,994

(22) Filed: Jun. 30, 2017

(65) Prior Publication Data

US 2018/0006569 A1    Jan. 4, 2018

(30) Foreign Application Priority Data

Jul. 1, 2016   (JP) .................................. 2016-131926
Jul. 15, 2016  (JP) .................................. 2016-140107
Jun. 9, 2017   (JP) .................................. 2017-114448

(51) Int. Cl.
*H02M 3/335*   (2006.01)
*H02M 3/158*   (2006.01)
(Continued)

(52) U.S. Cl.
CPC ........ *H02M 3/33592* (2013.01); *G05F 1/618* (2013.01); *H02M 3/1588* (2013.01); *H02M 3/33507* (2013.01); *H02M 1/32* (2013.01); *H02M 3/33576* (2013.01); *Y02B 70/1475* (2013.01)

(58) Field of Classification Search
CPC ........... H02M 3/33592; H02M 3/1588; H02M 3/33507; H02M 3/335; H02M 3/33553; H02M 3/33523; H02M 3/33576; H02M 2001/0032; H02M 2001/0054; H02M 1/32; Y02B 70/1475; Y02B 70/1491; Y02B 70/1433; Y02B 70/16
See application file for complete search history.

(56) References Cited

U.S. PATENT DOCUMENTS

2010/0085675 A1*  4/2010  Oki ......................... H02M 1/08
                                                     361/101
2013/0107585 A1*  5/2013  Sims ................. H02M 3/33592
                                                     363/21.14

(Continued)

FOREIGN PATENT DOCUMENTS

JP        2009159721 A    7/2009

*Primary Examiner* — Gustavo A Rosario-Benitez
(74) *Attorney, Agent, or Firm* — Cantor Colburn LLP

(57) ABSTRACT

A synchronous rectification controller configured to control a synchronous rectification transistor is provided on the secondary side of an insulated synchronous rectification DC/DC converter. A DRAIN pin receives the drain voltage $V_{DS2}$ of the synchronous rectification transistor. A pulse generator generates a pulse signal $S_{11}$ based on the voltage at the DRAIN pin. A driver drives the synchronous rectification transistor based on the pulse signal $S_{11}$. Upon detecting an open-circuit fault of the DRAIN pin, an abnormality detection circuit asserts an abnormality detection signal $S_{13}$.

22 Claims, 21 Drawing Sheets

(51) Int. Cl.
*G05F 1/618* (2006.01)
*H02M 1/32* (2007.01)

(56) References Cited

U.S. PATENT DOCUMENTS

| | | | |
|---|---|---|---|
| 2014/0192565 A1* | 7/2014 | Wang | H02M 3/33592 363/21.14 |
| 2014/0192569 A1* | 7/2014 | Espino | H02H 7/1213 363/50 |
| 2015/0023062 A1* | 1/2015 | Hyugaji | H02M 3/33592 363/16 |
| 2015/0214727 A1* | 7/2015 | Chen | H02J 3/01 363/56.02 |
| 2015/0280584 A1* | 10/2015 | Gong | H02M 3/33515 363/21.13 |
| 2015/0365006 A1* | 12/2015 | Choi | H02M 3/33592 363/21.02 |
| 2015/0372601 A1* | 12/2015 | Shiu | H02M 1/32 363/21.12 |
| 2015/0372603 A1* | 12/2015 | Tang | H02M 3/33523 363/21.15 |
| 2016/0057822 A1* | 2/2016 | Chu | H02M 1/4208 315/201 |
| 2016/0261203 A1* | 9/2016 | Kikuchi | H02M 3/33523 |
| 2016/0352231 A1* | 12/2016 | Quigley | H02M 3/33507 |
| 2017/0358995 A1* | 12/2017 | Tanaka | H02M 3/285 |

\* cited by examiner

INSULATED SYNCHRONOUS RECTIFICATION DC/DC CONVERTER INCLUDING SYNCHRONOUS RECTIFICATION CONTROLLER CONTROLLING SYNCHRONOUS RECTIFICATION TRANSISTOR

CROSS REFERENCE TO RELATED APPLICATIONS

The present invention claims priority under 35 U.S.C. § 119 to Japanese Applications 2016-131926 filed Jul. 1, 2016; 2016-140107 filed Jul. 15, 2016; and, 2017-114448 filed Jun. 9, 2017, the entire contents of which are also incorporated herein by reference.

BACKGROUND OF THE INVENTION

1. Field of the Invention

The present invention relates to an insulated synchronous rectification DC/DC converter.

2. Description of the Related Art

Various kinds of power supply circuits such as AC/DC converters or the like employ a flyback DC/DC converter. FIG. 1A is a circuit diagram showing a diode rectification flyback converter 200R. FIG. 1B is a circuit diagram showing a synchronous rectification flyback converter 200S.

The flyback converter 200R shown in FIG. 1A receives an input voltage VIN via its input terminal P1, generates a DC output voltage $V_{OUT}$ stabilized to a predetermined target voltage, and supplies the output voltage $V_{OUT}$ thus generated to a load (not shown) coupled between an output terminal P2 and a ground terminal P3. A transformer T1 is arranged such that its primary winding W1 is coupled to a switching transistor M1, and its secondary winding W2 is coupled to a diode D1. An output capacitor C1 is coupled to the output terminal P2.

A feedback circuit 206 drives a light emitting element of a photocoupler 204 by supplying a current that corresponds to a difference between the output voltage $V_{OUT}$ and its target voltage $V_{OUT(REF)}$. A feedback current $I_{FB}$ flows through a light-receiving element of the photocoupler 204 according to this difference. A feedback signal $V_{FB}$ that corresponds to the feedback current $I_{FB}$ is generated at a FB (feedback) pin of a primary controller 202. The primary controller 202 generates a pulse signal having a duty ratio (or frequency) that corresponds to the feedback signal $V_{FB}$, so as to drive the switching transistor M1.

With the diode rectification flyback converter shown in FIG. 1A, the diode D1 involves power loss represented by (Vf×$I_{OUT}$). Here, Vf represents the forward voltage, and $I_{OUT}$ represents the load current. In a case in which Vf=0.5 V and $I_{OUT}$=10 A, the power loss is 5 W. Accordingly, in many usage cases, such an arrangement requires a radiator plate or a heat sink in order to cool the diode D1.

The flyback converter 200S shown in FIG. 1B includes a synchronous rectification transistor M2 and a synchronous rectification controller (which will also be referred to as the "synchronous rectification IC") 300S, instead of the diode D1 shown in FIG. 1A. The synchronous rectification controller 300S switches on and off the synchronous rectification transistor M2 in synchronization with the switching of the primary-side switching transistor M1.

With such a synchronous rectification flyback converter, the synchronous rectification transistor M2 involves power loss represented by $R_{ON} \times I_{OUT}^2$. Here, $R_{ON}$ represents the on resistance of the synchronous rectification transistor M2. In a case in which $R_{ON}$=5 mΩ and $I_{OUT}$=10 A, such an arrangement involves power loss of 0.5 W. Such an arrangement allows the power loss to be dramatically reduced as compared with diode rectification converters. Thus, in principle, such a synchronous rectification converter requires no radiator plate or heat sink, or otherwise allows such a radiator plate or heat sink to have a simple structure.

As a result of investigating such a synchronous rectification converter shown in FIG. 1B, the present inventor has come to recognize the following problem.

Problem 1

With the synchronous rectification controller 300S, when the switching transistor M1 is turned off, the synchronous rectification transistor M2 is turned on. When the current that flows through the secondary winding W2 becomes zero (secondary-side zero current), the synchronous rectification transistor M2 is turned off. In order to provide such a control operation, the synchronous rectification controller 300S monitors a drain voltage $V_{DS2}$ of the synchronous rectification transistor M2. The synchronous rectification controller 300S detects the turning off of the switching transistor M1 and the secondary-side zero current based on the drain voltage $V_{DS2}$.

If a fault exists in the mounting of the synchronous rectification controller 300s or in the mounting of a peripheral circuit element, an open-circuit fault (disconnection) of the DRAIN pin of the synchronous rectification controller 300s occurs. Such a fault in the mounting is not restricted in particular. Specific examples of a fault in the mounting include: disconnection that has occurred at a soldered connection between the DRAIN pin and the circuit substrate; disconnection that has occurred at a soldered connection between the DRAIN pin and the drain electrode of the synchronous rectification transistor M2; and a disconnection that has occurred in the printed wiring. If such an open-circuit fault of the DRAIN pin occurs, this leads to a problem in that the drain voltage $V_{DS2}$ of the synchronous rectification transistor M2 cannot be detected.

In a case in which the drain voltage $V_{DS2}$ of the synchronous rectification transistor M2 cannot be detected, such an arrangement is not able to generate a gate pulse to be supplied to the synchronous rectification transistor M2. Accordingly, the synchronous rectification transistor M2 is fixed to an off state. In this state, in the DC/DC converter 200s, the body diode D2 of the synchronous rectification transistor M2 provides the same function as that of the diode D1 shown in FIG. 1A. Accordingly, even in such a situation, the DC/DC converter 200s operates in the diode rectification mode. That is to say, even in such a situation, such an arrangement supplies an appropriate output voltage $V_{OUT}$ to the load. However, such an arrangement involves large power loss of 5 W at the body diode D2, which is a problem.

In a case in which a current continuously flows through the body diode D2 of the synchronous rectification transistor M2, this leads to a problem of abnormal generation of heat in the synchronous rectification transistor M2. Furthermore, due to the heat generated in the synchronous rectification transistor M2, there is a risk of degradation in the reliability of the synchronous rectification transistor M2 itself or otherwise of the peripheral circuit elements.

In order to solve such a problem, there is a need to provide a countermeasure. For example, a large-capacity diode element (not shown) having a capacitance that is higher than that of the body diode D2 is coupled in reverse parallel with the synchronous rectification transistor M2. This leads to increased costs and an increased mounting area.

Problem 2.

As a result of investigating such a synchronous rectification converter shown in FIG. 1B, the present inventor has come to recognize the following problem.

In order to provide improved reliability, the DC/DC converter 200S is provided with a protection circuit such as an overvoltage protection (OVP) circuit 390 or the like. For example, the OVP circuit 390 is built into the feedback circuit 206. When an overvoltage state has occurred, the OVP circuit 390 supplies a current $I_{OVP}$ to a light-emitting element of the photocoupler 204.

FIG. 11 is an operation waveform diagram showing the operation of the DC/DC converter 200S shown in FIG. 1B. Before the time point $t_0$, the DC/DC converter 200S operates in a normal state, and the output voltage $V_{OUT}$ is stabilized to its target value $V_{OUT(REF)}$. A fault of some kind occurs at the time point $t_0$. After the time point $t_0$, the output voltage $V_{OUT}$ deviates and starts to rise from the target value $V_{OUT(REF)}$.

When the output voltage $V_{OUT}$ exceeds an overvoltage threshold value $V_{OVP}$ at the time point $t_1$, the OVP circuit 390 enters a state in which it supplies a current $I_{OVP}$ to the light-emitting element of the photocoupler 204, and the state is fixed (latched). As a result, the feedback current $I_{FB}$ rises, which lowers the feedback signal $V_{FB}$, thereby suspending the switching of the switching transistor M1.

With the suspension of the switching of the switching transistor M1, the charging operation for the output capacitor C1 is suspended. As a result, the output voltage $V_{OUT}$ falls with time. The feedback circuit 206 receives the output voltage $V_{OUT}$ as a power supply voltage $V_{CC}$. Accordingly, if the output voltage $V_{OUT}$ falls, the OVP circuit 390 becomes inoperative, and is not able to secure the current $I_{OVP}$. For example, the feedback circuit 206 includes an unshown UVLO (Under Voltage Lock Out) circuit as a built-in component. When $V_{CC} < V_{UVLO}$, the UVLO circuit is configured to reset the OVP state of the feedback circuit 206.

When the current low (and current $I_{ERR}$) becomes zero at the time point $t_2$ due to the fall of the output voltage $V_{OUT}$, i.e., the fall of the power supply voltage $V_{CC}$, the feedback current $I_{FB}$ also becomes zero. As a result, the feedback signal $V_{FB}$ rises, and accordingly, the switching of the switching transistor M1 is started again. After the switching is thus started again, the output voltage $V_{OUT}$ rises again.

If the cause of the overvoltage remains, the output voltage $V_{OUT}$ reaches the overvoltage threshold value $V_{OVP}$ again. Accordingly, the DC/DC converter 200S alternately repeats operation and suspension in a time sharing manner (which is referred to as an "intermittent mode").

In some cases, heat generated in circuit elements that form the DC/DC converter 200S, i.e., specifically, heat generated in the synchronous rectification transistor M2 or the switching transistor M1, becomes a problem. In the intermittent mode shown in FIG. 11, heat is generated in the operating period, leading to an increase in the temperature. In the suspension period, the temperature is relaxed. Accordingly, as the suspension period becomes shorter, the temperature of the circuit elements rapidly becomes higher.

It should be noted that description has been made above regarding overvoltage protection. Also, similar problems can occur in other kinds of protection circuits.

SUMMARY OF THE INVENTION

An embodiment of the present invention has been made in order to solve the first problem. Accordingly, it is an exemplary purpose of the embodiment of the present invention to provide a DC/DC converter with improved reliability. Also, an embodiment of the present invention has been made in order to solve the second problem. Accordingly, it is an exemplary purpose of the embodiment of the present invention to provide a DC/DC converter that is capable of suppressing heat generation.

1. An embodiment of the present invention relates to a synchronous rectification controller structured to control a synchronous rectification transistor of an insulated synchronous rectification DC/DC converter. The synchronous rectification controller comprises: a drain pin structured to receive a drain voltage of the synchronous rectification transistor; a pulse generator structured to generate a pulse signal based on a voltage at the drain pin; a driver structured to drive the synchronous rectification transistor based on the pulse signal; and an abnormality detection circuit structured to assert an abnormality detection signal when an open-circuit fault of the drain pin is detected.

By providing the synchronous rectification controller with a function for detecting an open-circuit fault of the drain pin, such an arrangement is capable of providing appropriate protection when an open-circuit fault of the drain pin has occurred. This prevents the DC/DC converter from continuing to operate in the diode rectification mode, thereby providing improved reliability.

Also, the abnormality detection circuit may be structured such that, when no cyclic signal occurs at the drain pin, and when the DC/DC converter generates an output voltage, the abnormality detection signal is asserted.

In a state in which the primary-side switching is suspended, i.e., in the suspension state of the DC/DC converter, there in no cyclic signal generated at the drain pin even if the drain pin operates normally. Accordingly, by monitoring the output voltage, such an arrangement is capable of judging whether or not the DC/DC converter is suspended or operating.

Also, the abnormality detection circuit may be structured such that, when the pulse signal is maintained at a constant value, and when the DC/DC converter generates an output voltage, the abnormality detection signal is asserted.

If the drain pin enters an open-circuit state when the DC/DC converter is operating, the pulse signal generation is stopped. Accordingly, by monitoring the pulse signal, such an arrangement is capable of indirectly detecting the presence or absence of the generation of the cyclic signal.

Also, the abnormality detection circuit may comprise a comparator structured to compare a detection voltage that corresponds to the output voltage of the DC/DC converter with a predetermined threshold voltage. This allows direct detection to be made regarding whether or not the output voltage is generated.

Also, the DC/DC converter may comprise: a photocoupler comprising a light-emitting element and a light-receiving element; a feedback circuit structured to drive the light-emitting element of the photocoupler such that the output voltage of the DC/DC converter approaches a target voltage; and a primary controller structured to perform switching of a switching transistor according to a feedback signal received from the light-receiving element.

Also, the abnormality detection circuit may judge, based on a current that flows through the light-emitting element, whether or not the DC/DC converter has generated the output voltage. This allows indirect detection to be made regarding whether or not the output voltage is generated.

Also, the feedback circuit may comprise: an error amplifier structured to amplify a difference between a detection voltage that corresponds to the output voltage of the DC/DC converter and a target voltage thereof and a first transistor having a control terminal coupled to an output terminal of the error amplifier, and arranged on the same current path as the light-emitting element. Also, the abnormality detection circuit may comprise a second transistor coupled with the first transistor so as to form a current mirror circuit. Also, the abnormality detection circuit may judge, based on a current that flows through the second transistor, whether or not the output voltage is generated by the DC/DC converter.

In this case, such a voltage comparator is not required, thereby allowing the circuit to have a simple configuration.

Also, the DC/DC converter may comprise: a photocoupler comprising a light-emitting element and a light-receiving element; a feedback circuit structured to drive the light-emitting element of the photocoupler such that an output voltage of the DC/DC converter approaches a target voltage; and a primary controller structured to perform switching of a switching transistor according to a feedback signal received from the light-receiving element. Also, the abnormality detection circuit may be structured to drive the light-emitting element of the photocoupler in response to the assertion of the abnormality detection signal.

By driving the light-emitting element of the photocoupler, such an arrangement is capable of suspending the switching of the switching transistor controlled by means of the primary controller, or otherwise of reducing the on time of the switching thereof, thereby allowing the electric power to be reduced.

Also, the DC/DC converter may comprise: a first photocoupler comprising a first light-emitting element and a first light-receiving element; a feedback circuit structured to drive the first light-emitting element such that an output voltage of the DC/DC converter approaches a target voltage; a primary controller structured to perform switching of a switching transistor according to a feedback signal received from the first light-receiving element; and a second photocoupler comprising a second light-emitting element and a second light-receiving element. The abnormality detection circuit may drive the second light-emitting element in response to the assertion of the abnormality detection signal. Also, the primary controller may be structured to suspend the switching of the switching transistor or otherwise to reduce an on time thereof based on a current that flows through the second light-receiving element.

Also, the feedback circuit may comprise: an error amplifier structured to amplify a difference between a detection voltage that corresponds to the output voltage of the DC/DC converter and a target voltage thereof; and a first transistor comprising a control terminal coupled to an output terminal of the error amplifier, and arranged on the same current path as the light-emitting element. Also, the abnormality detection circuit may comprise a third transistor arranged in parallel with the first transistor and structured to turn on the third transistor according to the assertion of the abnormality detection signal.

Also, the feedback circuit may be housed in the same package as the synchronous rectification controller.

Also, the synchronous rectification controller may monolithically be integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By monolithically integrating the circuit on a single chip, such an arrangement allows the circuit area to be reduced, and allows the circuit elements to have uniform characteristics.

Another embodiment of the present invention relates to a DC/DC converter. The DC/DC converter may comprise any one of the aforementioned synchronous rectification controllers. Also, the DC/DC converter may be configured as a flyback converter. Also, the DC/DC converter may be configured as an LLC converter.

Yet another embodiment of the present invention also relates to an insulated synchronous rectification DC/DC converter. The DC/DC converter comprises: a transformer comprising a primary winding and a secondary winding; a switching transistor coupled to the primary winding of the transformer; a synchronous rectification transistor coupled to the secondary winding of the transformer; a photocoupler comprising a light-emitting element and a light-receiving element; a feedback circuit structured to drive the light-emitting element of the photocoupler such that an output voltage of the DC/DC converter approaches a target voltage; a primary controller structured to perform switching of a switching transistor according to a feedback signal received from the light-receiving element; and a synchronous rectification controller comprising a drain pin coupled to a drain of the synchronous rectification transistor and structured to drive the synchronous rectification transistor based on a voltage at the drain pin. Upon detecting an open-circuit fault of the drain pin, the synchronous rectification controller suspends the switching of the switching transistor controlled by the primary controller.

2. An embodiment of the present invention relates to an insulated synchronous rectification DC/DC converter. The DC/DC converter comprises: a transformer comprising a primary winding and a secondary winding; a switching transistor coupled to the primary winding of the transformer; a synchronous rectification transistor coupled to the secondary winding of the transformer; a photocoupler comprising a light-emitting element and a light-receiving element; a feedback circuit structured to drive the light-emitting element of the photocoupler such that a detection voltage that corresponds to an output voltage of the DC/DC converter approaches a target voltage; a primary controller coupled to the light-receiving element of the photocoupler, and structured to perform switching of a switching transistor according to a feedback signal received from the light-receiving element; a synchronous rectification controller structured to drive the synchronous rectification transistor; and a first protection circuit structured to maintain a driving state of the light emitting element upon detecting an abnormality. An auxiliary power supply voltage to be supplied to at least a part of the first protection circuit falls at a rate that is lower than that of the output voltage in a state in which the DC/DC converter is suspended.

With such an embodiment, even after the output voltage $V_{OUT}$ falls, the auxiliary power supply voltage is maintained, thereby allowing the driving state of the light-emitting element to be maintained for a long period of time. This allows the heat releasing time to be increased when the DC/DC converter operates in an intermittent mode, thereby suppressing the generation of heat. At least a part of the first protection circuit may include necessary circuits (latch, flip-flop, memory, and the like) for maintaining the driving state of the light-emitting element.

Also, the first protection circuit may comprise: a first abnormality detection circuit structured to assert an abnormality detection signal upon detecting an abnormality; a latch circuit structured to enter a set state in response to an assertion of the abnormality detection signal; and a transistor coupled to the light-emitting element, and structured to enter an on state when the latch circuit enters the set state. Also, the auxiliary power supply voltage may be supplied to at least the latch circuit. By maintaining the power supply voltage for the latch circuit, such an arrangement is capable of maintaining the driving state of the light-emitting element.

Also, the first protection circuit may further comprise a reset circuit structured to reset the latch circuit when the auxiliary power supply voltage becomes lower than a state clearing threshold value. In this case, such an arrangement is capable of setting the length of the suspension period in the intermittent mode based on the falling rate of the auxiliary power supply voltage.

Also, the latch circuit may be automatically reset after a predetermined time elapses after the assertion of the abnormality detection signal. By providing the latch circuit with a timer function, such an arrangement is capable of setting the length of the suspension period in the intermittent mode based on the predetermined time set for the timer.

Also, the first protection circuit may be configured as an overvoltage protection circuit.

Also, the DC/DC converter may further comprise: a power supply capacitor provided as an additional capacitor that differs from an output capacitor coupled to an output line of the DC/DC converter; and a charging path for charging the power supply capacitor via the output line. Also, the auxiliary power supply voltage may be supplied as a voltage across the power supply capacitor.

This allows the length of the suspension period in the intermittent mode to be designed based on the capacitance value of the power supply capacitor.

Also, the charging path may comprise a rectifier element that allows a current to flow from the output line of the DC/DC converter to the power supply capacitor, and that blocks a current that flows in a reverse direction. Also, the charging path may comprise a diode arranged such that an anode thereof is coupled to the output line side of the DC/DC converter and a cathode thereof is coupled to the power supply capacitor side.

Also, the DC/DC converter may further comprise a second protection circuit structured to detect a switching-incapable state in which the synchronous rectification transistor is not able to perform switching. Upon detecting the switching-incapable state, the second protection circuit may forcibly lower the detection voltage to be input to the feedback circuit.

In the switching-incapable state, this reduces the driving current supplied from the feedback circuit to the light-emitting element of the photocoupler, and accordingly, the feedback signal rises, thereby increasing the duty ratio of the switching of the switching transistor. As a result, the output voltage starts to rise. Eventually, when the output voltage exceeds the overvoltage threshold value, the overvoltage protection circuit performs protection so as to suspend the switching of the switching transistor.

That is to say, if a switching-incapable state of the synchronous rectification transistor has occurred, a sequence of raising the output voltage, overvoltage protection, suspension of switching, and restarting switching is repeated. In the switching-incapable state, the DC/DC converter operates in the diode rectification mode using the body diode of the synchronous rectification transistor. This involves marked heat generation in the synchronous rectification transistor. By increasing the suspension time of the intermittent operation, such an arrangement is capable of suppressing an increase in the temperature of the synchronous rectification transistor.

Also, the second protection circuit may be arranged as an external component of the synchronous rectification controller, may be coupled to a gate electrode of the synchronous rectification transistor, and may be structured to forcibly lower the detection voltage when no pulse is generated at the gate electrode.

With the second protection circuit, such an arrangement is capable of detecting a switching-incapable state due to an open-circuit state of the gate pin of the synchronous rectification controller. Thus, such an arrangement is capable of providing an appropriate protection measure when an open-circuit fault of the gate pin has occurred.

Also, the second protection circuit may be structured such that, when a load power of the DC/DC converter is small, the detection voltage is not lowered.

The load power of the DC/DC converter is proportional to the current that flows through the synchronous rectification transistor. Accordingly, when the load power is small, the amount of current that flows through the synchronous rectification transistor is also small. Thus, in some cases, there is no problem even in a case in which the diode rectification mode operation is performed. With the embodiment, when the load power is smaller than a predetermined level, such an arrangement allows electric power to be continuously supplied to the load.

Also, the synchronous rectification controller, the feedback circuit, and the first protection circuit may be housed in a single package.

Also, the feedback circuit and the first protection circuit may be integrated on a single chip.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By monolithically integrating the circuit on a single chip, such an arrangement allows the circuit area to be reduced, and allows the circuit elements to have uniform characteristics.

Also, the synchronous rectification controller, the feedback circuit, and the first protection circuit may be integrated on a single chip.

Another embodiment of the present invention relates to a feedback circuit employed in an insulated synchronous rectification DC/DC converter. The DC/DC converter comprises: a transformer comprising a primary winding and a secondary winding; a switching transistor coupled to the primary winding of the transformer; a synchronous rectification transistor coupled to the secondary winding of the transformer; a photocoupler comprising a light-emitting element and a light-receiving element; a primary controller coupled to the light-receiving element of the photocoupler, and structured to perform switching of the switching transistor according to a feedback signal received from the light-receiving element; and a synchronous rectification controller structured to drive the synchronous rectification transistor. The feedback circuit comprises: a power supply pin structured to receive an auxiliary power supply voltage that falls at a slower rate than that of the output voltage in a state in which the DC/DC converter is suspended; a control input pin structured to receive the detection voltage; a control output pin coupled to the light-emitting element; an error amplifier structured to amplify a difference between the detection voltage and a reference voltage; a first transistor coupled to the control output pin, and structured to be driven according to an output signal of the error amplifier; and an overvoltage protection circuit structured such that, upon detecting an overvoltage state, a driving state of the light-emitting element is maintained. The auxiliary power supply voltage is supplied to at least a part of the overvoltage protection circuit.

Also, the overvoltage protection circuit may comprise: an overvoltage detection circuit structured to assert an overvoltage detection signal upon detecting the overvoltage state; a latch circuit structured to enter a set state in response to the assertion of the overvoltage detection signal; and a second transistor coupled to the light-emitting element, and structured to enter an on state when the latch circuit enters the set state. Also, the auxiliary power supply voltage may be supplied to at least the latch circuit.

Also, the feedback circuit may be housed in the same package as the synchronous rectification controller.

Yet another embodiment of the present invention relates to a DC/DC converter. The DC/DC converter may comprise the aforementioned feedback circuit.

Yet another embodiment of the present invention relates to an electronic device. The electronic device may comprise: a load; a diode rectification circuit structured to perform full-wave rectification of a commercial AC voltage; a smoothing capacitor structured to smooth an output voltage of the diode rectification circuit so as to generate a DC input voltage; and any one of the aforementioned DC/DC converters structured to step down the DC input voltage, and to supply the DC input voltage thus stepped down to the load.

Yet another embodiment of the present invention relates to a power supply adapter. The power supply adapter may comprise: a diode rectification circuit structured to perform full-wave rectification of a commercial AC voltage; a smoothing capacitor structured to smooth an output voltage of the diode rectification circuit so as to generate a DC input voltage; and any one of the aforementioned DC/DC converters structured to step down the DC input voltage, and to supply the DC input voltage thus stepped down to a load.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, examples of the state represented by the phrase "the member A is coupled to the member B" include: a state in which the member A is physically and directly coupled to the member B; and a state in which the member A is coupled to the member B via another member that does not substantially affect the electric connection therebetween, or that does not damage the functions of the connection therebetween.

Similarly, the state represented by the phrase "the member C is provided between the member A and the member B" includes a state in which the member A is indirectly coupled to the member C, or the member B is indirectly coupled to the member C via another member that does not substantially affect the electric connection therebetween, or that does not damage the functions of the connection therebetween, in addition to a state in which they are directly coupled.

First Embodiment

Figure 1A:
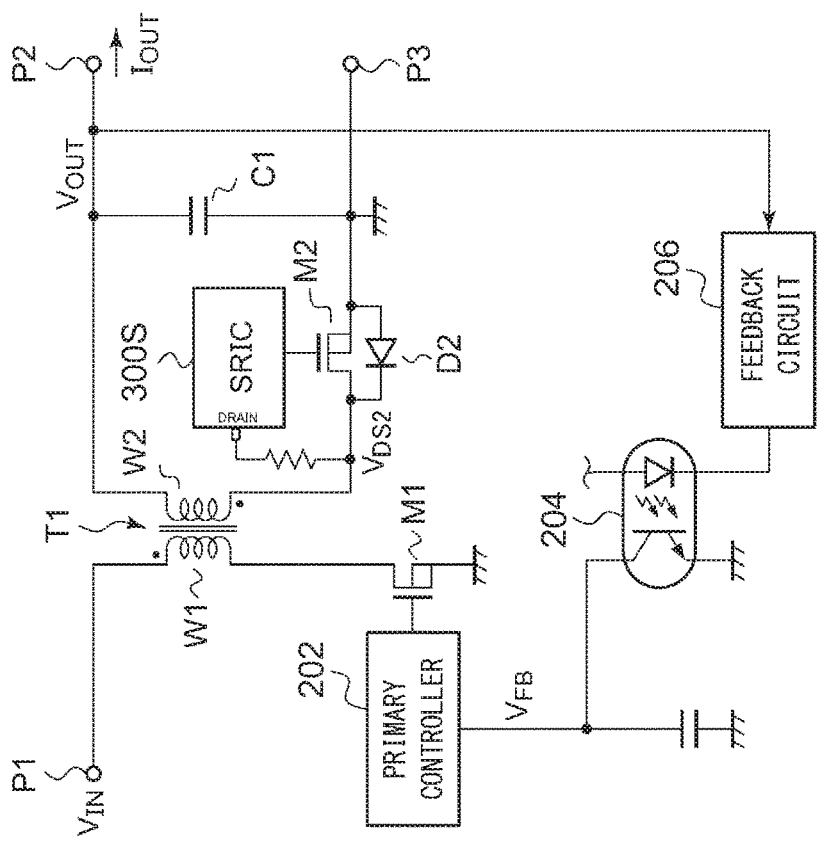
FIG. 1A is a circuit diagram showing a diode rectification flyback converter.
Figure 1B:
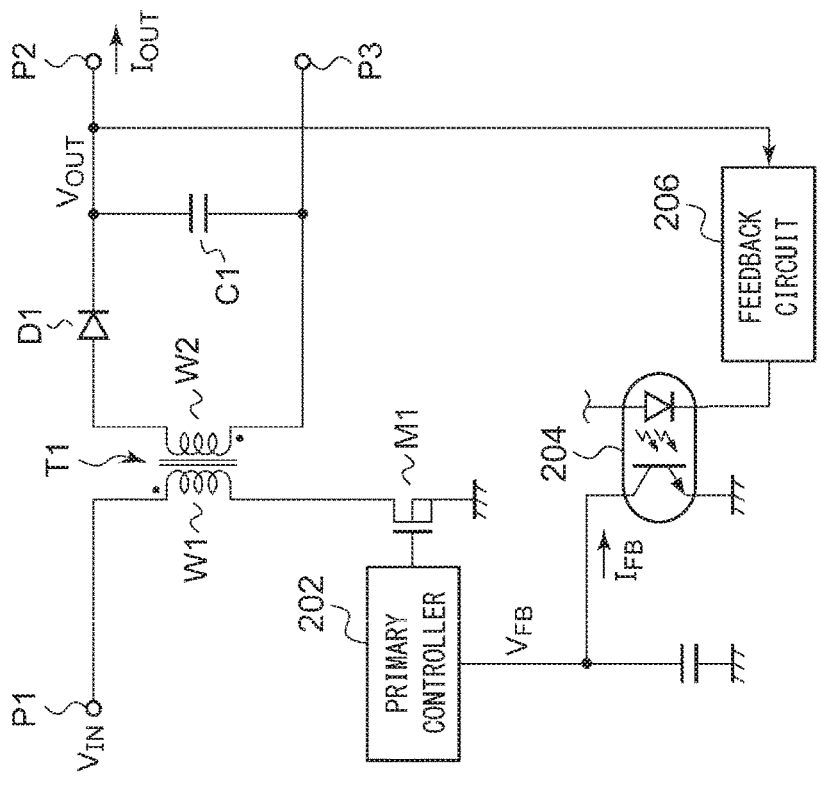
FIG. 1B is a circuit diagram showing a synchronous rectification flyback converter.
Figure 2:
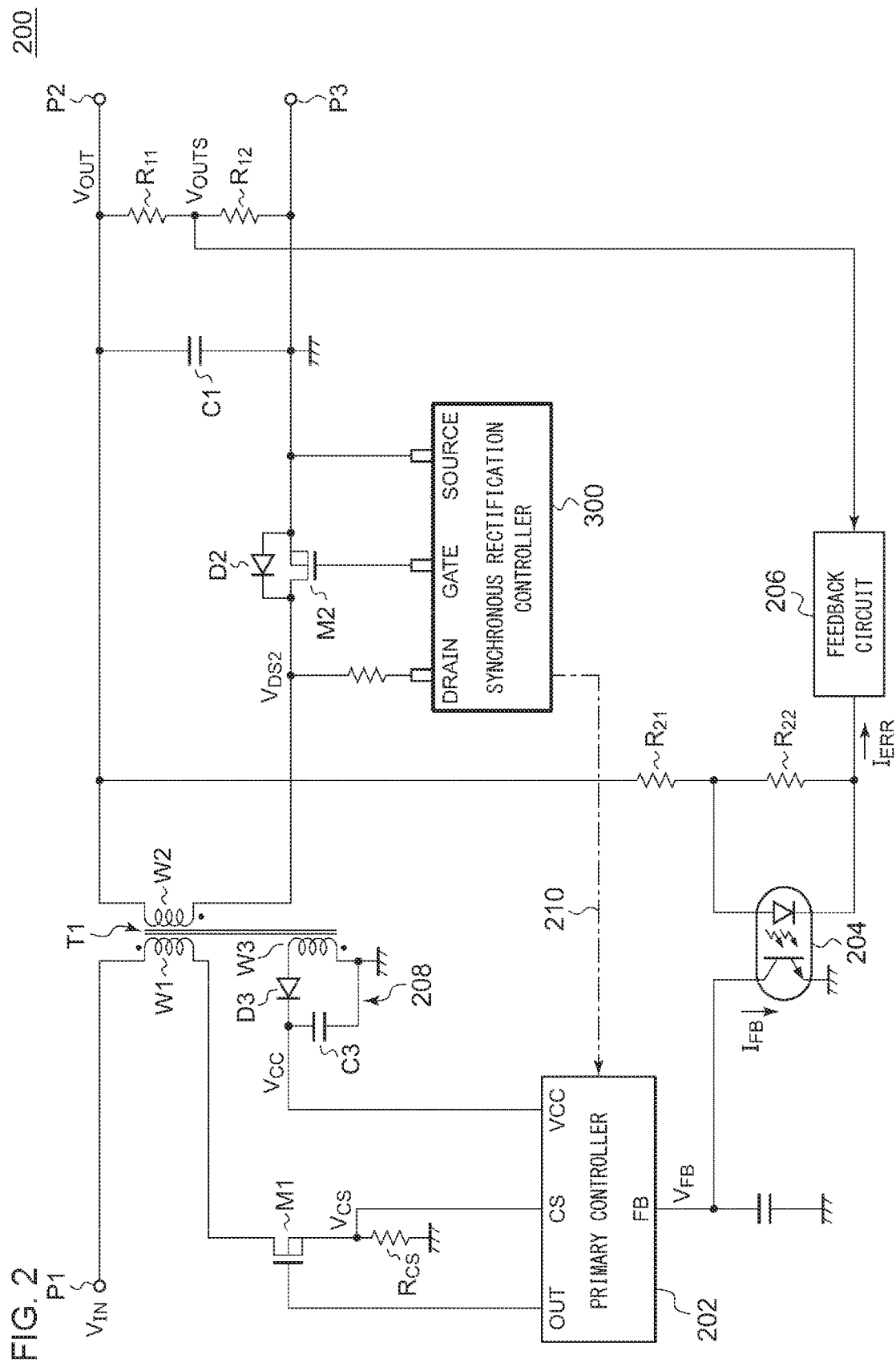
FIG. 2 is a circuit diagram showing an insulated DC/DC converter according to a second embodiment.

FIG. 2 is a circuit diagram showing an insulated DC/DC converter 200 according to a first embodiment. The DC/DC converter 200 is a flyback converter configured to receive an input voltage $V_{IN}$ via its input terminal P1, to generate a DC output voltage $V_{OUT}$ stabilized to a predetermined target voltage, and to supply the output voltage $V_{OUT}$ to a load (not shown) coupled to its output terminal P2.

A transformer T1 includes a primary winding W1, a secondary winding W2, and an auxiliary winding W3. One end of the primary winding W1 is coupled to the input terminal P1 so as to receive the DC input voltage $V_{IN}$. The drain of a switching transistor M1 is coupled to the other end of the primary winding W1 of the transformer T1. A sensing resistor $R_{CS}$ for current detection is arranged between the source of the switching transistor M1 and the ground line.

A synchronous rectification transistor M2 and the secondary winding W2 of the transformer T1 are arranged in series between the output terminal P2 and a ground terminal P3. An output capacitor C1 is coupled between the output terminal P2 and the ground terminal P3.

A photocoupler 204 includes a light-emitting element and a light-receiving element. The light-emitting element is biased by means of resistors $R_{21}$ and $R_{22}$. A feedback circuit 206 drives the light-emitting element of the photocoupler 204 such that the output voltage $V_{OUT}$ of the DC/DC converter 200 approaches a target voltage $V_{OUT(REF)}$. For example, the feedback circuit 206 receives a detection voltage $V_{OUTS}$ obtained by dividing the output voltage $V_{OUT}$ by means of the resistors $R_{11}$ and $R_{12}$. Furthermore, the feedback circuit 206 drives the light-emitting element of the photocoupler 204 using a current $I_{ERR}$ that corresponds to the difference between the detection voltage $V_{OUTS}$ and a target voltage thereof. For example, the feedback circuit 206 may include a shunt regulator, or may include an error amplifier.

The primary controller 202 is coupled to the light-receiving element of the photocoupler 204. A feedback signal $V_{FB}$ is generated at a feedback (FB) terminal of the primary controller 202 according to a feedback current $I_{FB}$ that flows through the light-receiving element of the photocoupler 204. Furthermore, a current detection signal $V_{CS}$ that occurs at the sensing resistor $R_{CS}$ is input to a current detection (CS) terminal of the primary controller 202.

The primary controller 202 outputs, via its output (OUT) terminal, a pulse signal having a duty ratio (or frequency) that corresponds to the feedback signal $V_{FB}$, so as to drive the switching transistor M1. The configuration and the control method employed in the primary controller 202 are not restricted in particular. For example, the primary controller 202 may be configured as a current-mode modulator. In this case, the duty ratio of the pulse signal is adjusted according to the current detection signal $V_{CS}$.

The auxiliary winding W3 of the transformer T1 forms a self-power supply circuit 208 together with a diode D3 and a capacitor C3. The power supply voltage $V_{CC}$ generated by the self-power supply circuit 208 is supplied to a power supply (VCC) terminal of the primary controller 202.

The synchronous rectification controller 300 controls the synchronous rectification transistor M2. A diode D2 is a body diode of the synchronous rectification transistor M2. For example, the synchronous rectification controller 300 generates a control pulse according to the drain-source voltage $V_{DS2}$ of the synchronous rectification transistor M2, and supplies a gate pulse that corresponds to the control pulse to the gate of the synchronous rectification transistor M2.

The synchronous rectification controller 300 is housed in a single package, and includes at least a drain (DRAIN) pin, a source (SOURCE) pin, and a gate (GATE) pin. The SOURCE pin is configured as a ground terminal of the synchronous rectification controller 300.

The synchronous rectification controller 300 drives the synchronous rectification transistor M2 based on a voltage $V_{D2}$ at the DRAIN pin (drain-source voltage $V_{DS2}$ of the synchronous rectification transistor M2).

Upon detecting an open-circuit fault of the DRAIN pin, the synchronous rectification controller 300 suspends the switching of the switching transistor M1 controlled by the primary controller 202. It should be noted that the line of alternately long and short dashes denoted by reference numeral 210 represents a path or a transmission mechanism for notifying the primary controller 202 of an open-circuit fault of the DRAIN pin. That is to say, the line of alternately long and short dashes does not represent a wire that couples the primary controller 202 and the synchronous rectification controller 300.

The above is the configuration of the DC/DC converter 200. In the DC/DC converter 200, the synchronous rectification controller 300 includes a built-in component that provides a function for detecting the occurrence of an open-circuit fault of the DRAIN pin. Such an arrangement prevents the DC/DC converter 200 from continuing to operate with a large amount of electric power in the diode rectification mode when an open-circuit fault of the DRAIN pin has occurred, thereby providing improved reliability.

The present invention encompasses various kinds of apparatuses and circuits that can be regarded as a block configuration or a circuit configuration shown in FIG. 2, or otherwise that can be derived from the aforementioned description. That is to say, the present invention is not restricted to a specific configuration. More specific description will be made below regarding an example configuration for clarification and ease of understanding of the essence of the present invention and the circuit operation. That is to say, the following description will by no means be intended to restrict the technical scope of the present invention.

Figure 3:
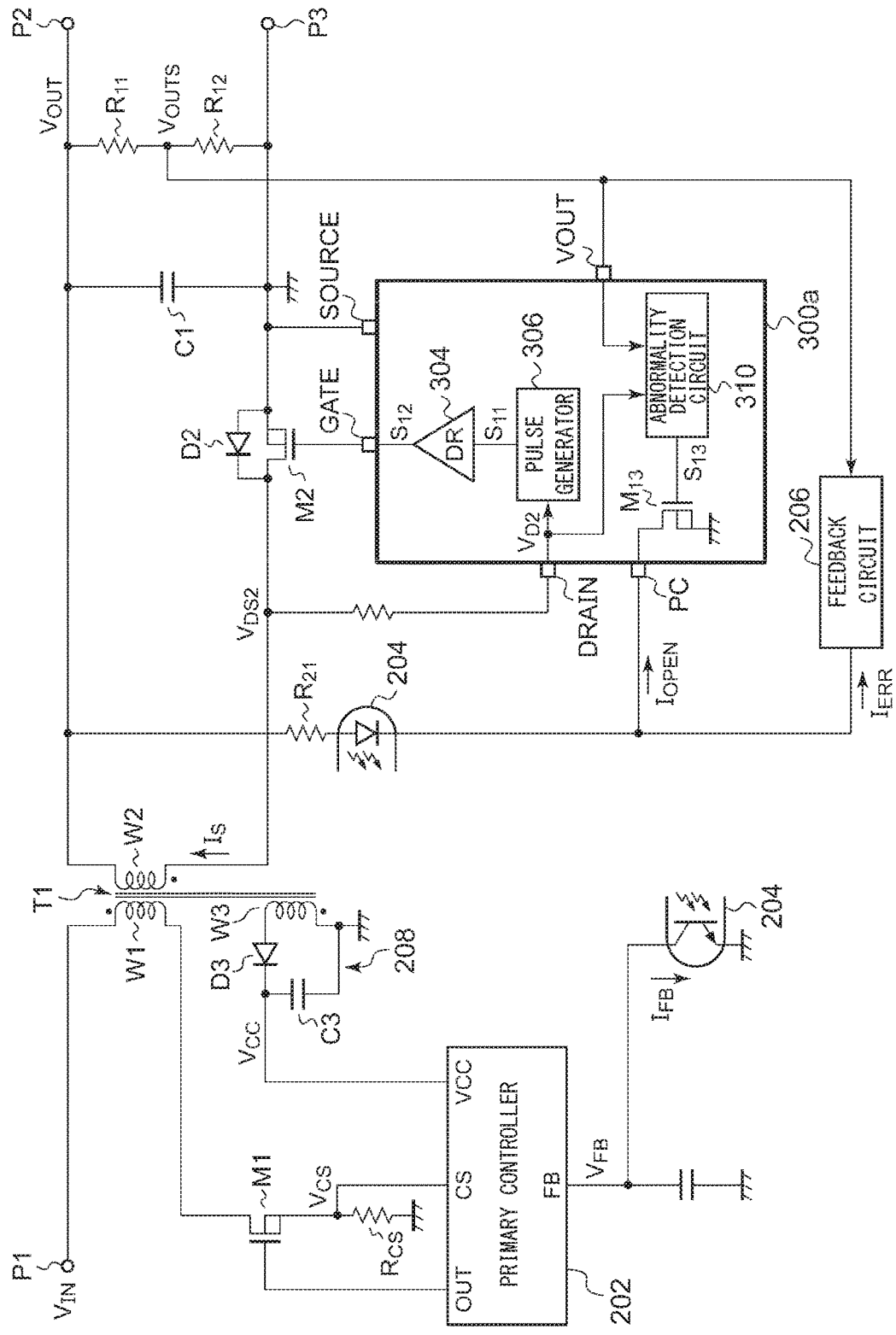
FIG. 3 is a circuit diagram showing a first example configuration of the DC/DC converter.

FIG. 3 is a circuit diagram showing a first example configuration (200a) of the DC/DC converter 200. A synchronous rectification controller 300a includes a driver 304, a pulse generator 306, and an abnormality detection circuit 310. The pulse generator 306 generates a pulse signal $S_{11}$ based on the voltage $V_{D2}$ at the DRAIN pin. The configuration and the control method employed in the pulse generator 306 are not restricted in particular. That is to say, known techniques may be employed. For example, the pulse generator 306 detects, based on the voltage $V_{D2}$ at the DRAIN pin, the turning off of the switching transistor M1 and the zero-current state in which the current $I_S$ that flows through the secondary winding W2 becomes substantially zero. The pulse generator 306 switches the pulse signal $S_{11}$ to the on level according to the turning off of the switching transistor M1 as a trigger. Furthermore, the pulse generator 306 switches the pulse signal $S_{11}$ to the off level according to the zero-current state as a trigger.

When a voltage comparator detects a crossing of the voltage $V_{D2}$ and a predetermined first threshold voltage $V_{THA}$ having a negative value (e.g., −150 mV), judgment may be made that the switching transistor M1 has been turned off.

During the on period of the synchronous rectification transistor M2, a current $I_S$ flows from the source to the drain of the synchronous rectification transistor M2. In this state, the drain-source voltage $V_{DS2}$ ($V_{D2}$) becomes a negative voltage having an absolute value that is proportional to the amount of the current $I_S$.

$$V_{DS2} = I_S \times R_{ON2}$$

Here, $R_{ON2}$ represents the on resistance of the synchronous rectification transistor M2. Thus, a voltage comparator may be provided to compare the drain voltage $V_{D2}$ with a second threshold voltage $V_{THB}$ set to a negative value in the vicinity of zero (e.g., −10 mV). When the drain voltage $V_{D2}$ becomes higher than the second threshold voltage $V_{THB}$, judgment may be made that the zero-current state has occurred. The driver 304 drives the synchronous rectification transistor M2 based on the pulse signal $S_{11}$.

The abnormality detection circuit 310 is configured to be capable of detecting the occurrence of an open-circuit fault of the DRAIN pin. Upon detecting an open-circuit fault, the abnormality detection circuit 310 asserts an abnormality detection signal $S_{13}$. The synchronous rectification controller 300a supplies a current $I_{OPEN}$ to the light-emitting element of the photocoupler 204 and drives the photocoupler 204 in response to the assertion of the abnormality detection signal $S_{13}$. For example, the synchronous rectification controller 300a may include a PC (photocoupler) terminal coupled to the cathode of the light-emitting element and a transistor $M_{13}$ arranged between the PC terminal and the ground.

When the transistor $M_{13}$ turns on in the open-circuit fault state, a large current $I_{OPEN}$ flows through the photocoupler 204, which increases the feedback current $I_{FB}$. This lowers the electric potential of the feedback signal $V_{FB}$ at the FB terminal, thereby suspending the switching of the switching transistor M1. That is to say, the transistor $M_{13}$ and the photocoupler 204 correspond to the transmission mechanism 210 represented by the line of alternately long and short dashes shown in FIG. 2.

Next, description will be made regarding a specific method for detecting an open-circuit fault state employed in the abnormality detection circuit 310. When a cyclic signal is not generated at the DRAIN pin and the DC/DC converter 200a generates the output voltage $V_{OUT}$, the abnormality detection circuit 310 asserts the abnormality detection signal $S_{13}$.

Figure 4:
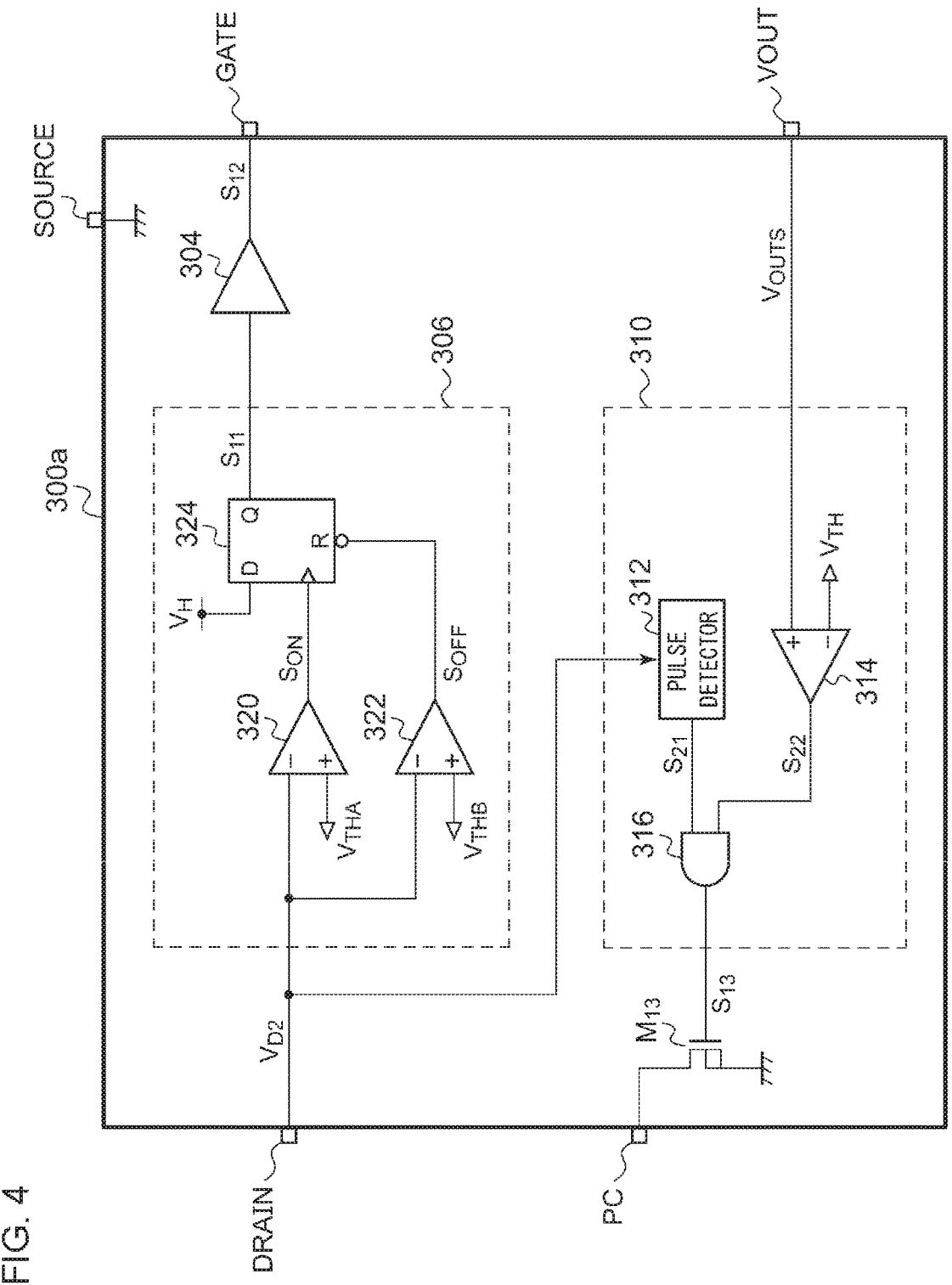
FIG. 4 is a specific circuit diagram showing a synchronous rectification controller.

FIG. 4 is a specific circuit diagram showing the synchronous rectification controller 300a. The abnormality detection circuit 310 includes a pulse detector 312, a comparator 314, and a logic gate 316. The pulse detector 312 judges whether or not a cyclic signal is generated at the DRAIN pin in synchronization with the switching of the switching transistor M1. For example, the pulse detector 312 includes an edge detector that detects an edge of the voltage $V_{D2}$. When an edge has not been detected for a predetermined period of time, the edge detector may assert (set to the high level, for example) a detection signal $S_{21}$. Alternatively, when there is no change in the output $S_{ON}$ of the first comparator 320 and the output $S_{OFF}$ of the second comparator 322, judgment may be made that the cyclic signal is not generated.

Furthermore, the comparator 314 compares the detection voltage $V_{OUTS}$ that corresponds to the output voltage $V_{OUT}$ of the DC/DC converter 200a with a predetermined threshold voltage $V_{TH}$. When $V_{OUTS} > V_{TH}$, the comparator 314 asserts (sets to the high level, for example) an output judgement signal $S_{22}$. When the detection signal $S_{21}$ and the output judgment signal $S_{22}$ are both asserted, the logic gate 316 asserts the abnormality detection signal $S_{13}$. For example, the logic gate 316 is an AND gate.

The pulse generator 306 includes a first comparator 320, a second comparator 322, and a logic circuit 324. Upon detecting the turning off of the switching transistor M1, the first comparator 320 asserts the on signal $S_{ON}$. Upon detecting the zero-current state of the secondary winding W2, the second comparator 322 asserts (sets to the low level in the negative logic system) the off signal $S_{OFF}$. The logic circuit 324 includes a D flip-flop. The logic circuit 324 generates a pulse signal $S_{11}$ that transits to the on level (high level) according to the on signal $S_{ON}$, and that transits to the off level (low level) according to the off signal $S_{OFF}$. The logic circuit 324 may be an SR flip-flop.

Figure 5:
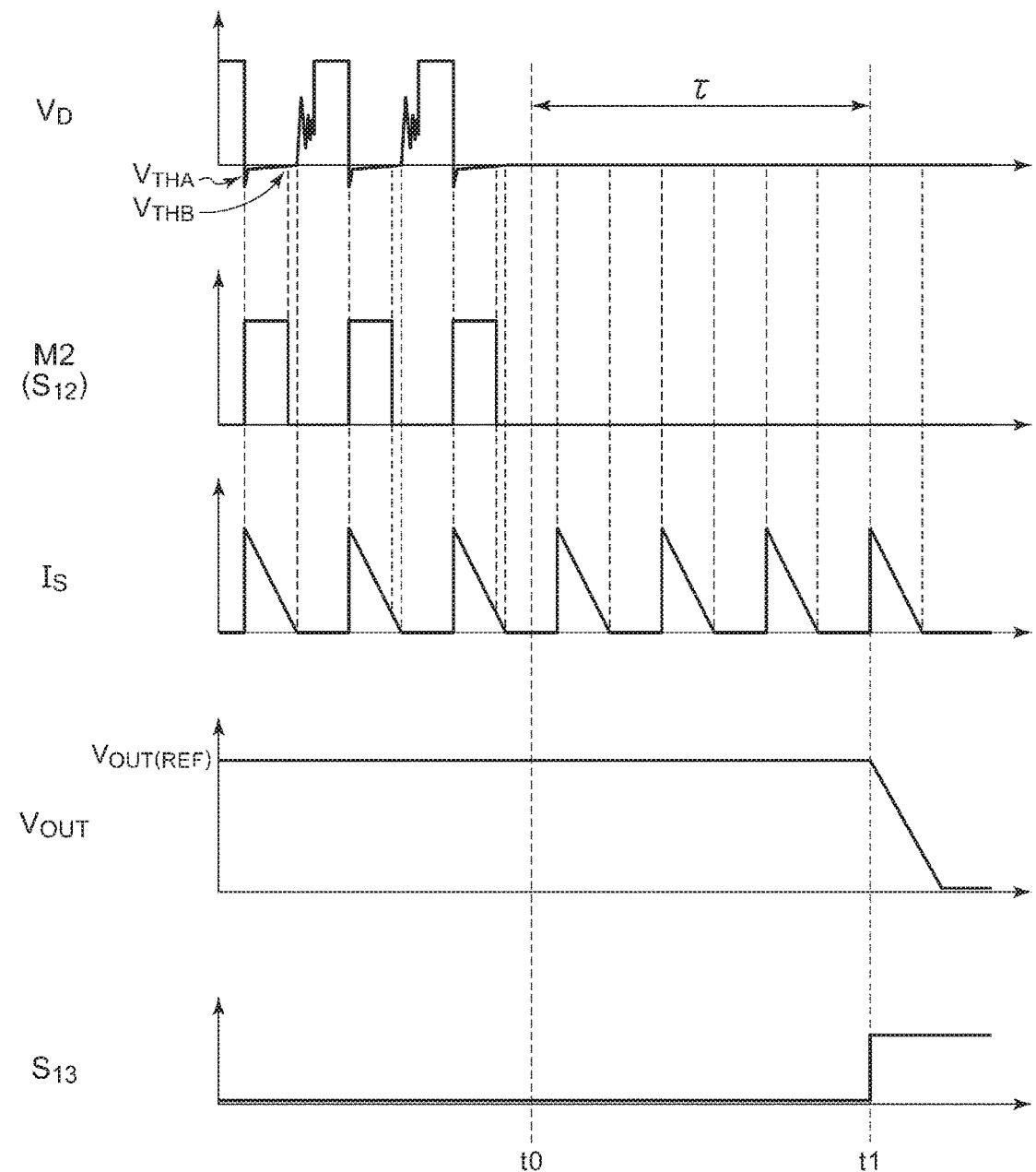
FIG. 5 is an operation waveform diagram showing the operation of the synchronous rectification controller shown in FIG. 4.

FIG. 5 is an operation waveform diagram showing the operation of the synchronous rectification controller 300a shown in FIG. 4. Before the time point t0, an open-circuit fault has not occurred. Accordingly, a cyclic signal $V_{D2}$ is generated at the DRAIN pin. In this state, the pulse signal $S_{11}$ is generated based on the comparison result between the voltage $V_{D2}$ and the threshold values $V_{THA}$ and $V_{THB}$, thereby driving the synchronous rectification transistor M2. The output voltage $V_{OUT}$ is stabilized to the target value $V_{OUT(REF)}$.

At the time point $t_0$, the DRAIN pin of the synchronous rectification controller 300 becomes separated from the circuit substrate, which leads to the occurrence of an open-circuit fault. In this case, the voltage $V_{D2}$ at the DRAIN pin becomes 0 V, and accordingly, the cyclic signal is not generated. When there is no cyclic voltage $V_{D2}$, such an arrangement is able to detect neither the turning off of the switching transistor M1 nor the zero-current state. As a result, the pulse signal $S_{11}$ cannot be generated, which suspends the switching of the synchronous rectification transistor M2. Even in such a situation, the DC/DC converter 200a continues to operate in the diode rectification mode. Accordingly, the output voltage $V_{OUT}$ is maintained at the target voltage $V_{OUT(REF)}$. As a result, the output judgement signal $S_{22}$ generated by the comparator 314 is asserted.

At the time point $t_1$ after the detection time period τ elapses from the time point $t_0$, the detection signal $S_{21}$ generated by the pulse detector 312 is asserted. In this state, the abnormality detection signal $S_{13}$ is asserted, and accordingly, the transistor $M_{13}$ is turned on. As a result, the operation of the switching transistor M1 on the primary side is suspended. In this state, the current $I_S$ that flows through the secondary winding W2 becomes zero, thereby suppressing heat generation that occurs in the synchronous rectification transistor M2 (body diode D2). As a result of the suspension of the switching of the switching transistor M1, the output voltage $V_{OUT}$ falls.

As described above, with the synchronous rectification controller 300a, such an arrangement is capable of detecting an open-circuit fault of the DRAIN pin, and suspending the switching of the switching transistor M1.

When the switching of the switching transistor M1 is suspended in a state in which the DRAIN pin operates normally, such a cyclic signal is not generated at the DRAIN pin. The abnormality detection circuit 310 shown in FIG. 4 employs the generation of the output voltage $V_{OUT}$ as a condition for the abnormality judgement. Therefore, such an arrangement is capable of preventing false detection of an open-circuit fault from occurring in the suspension state.

Figure 6:
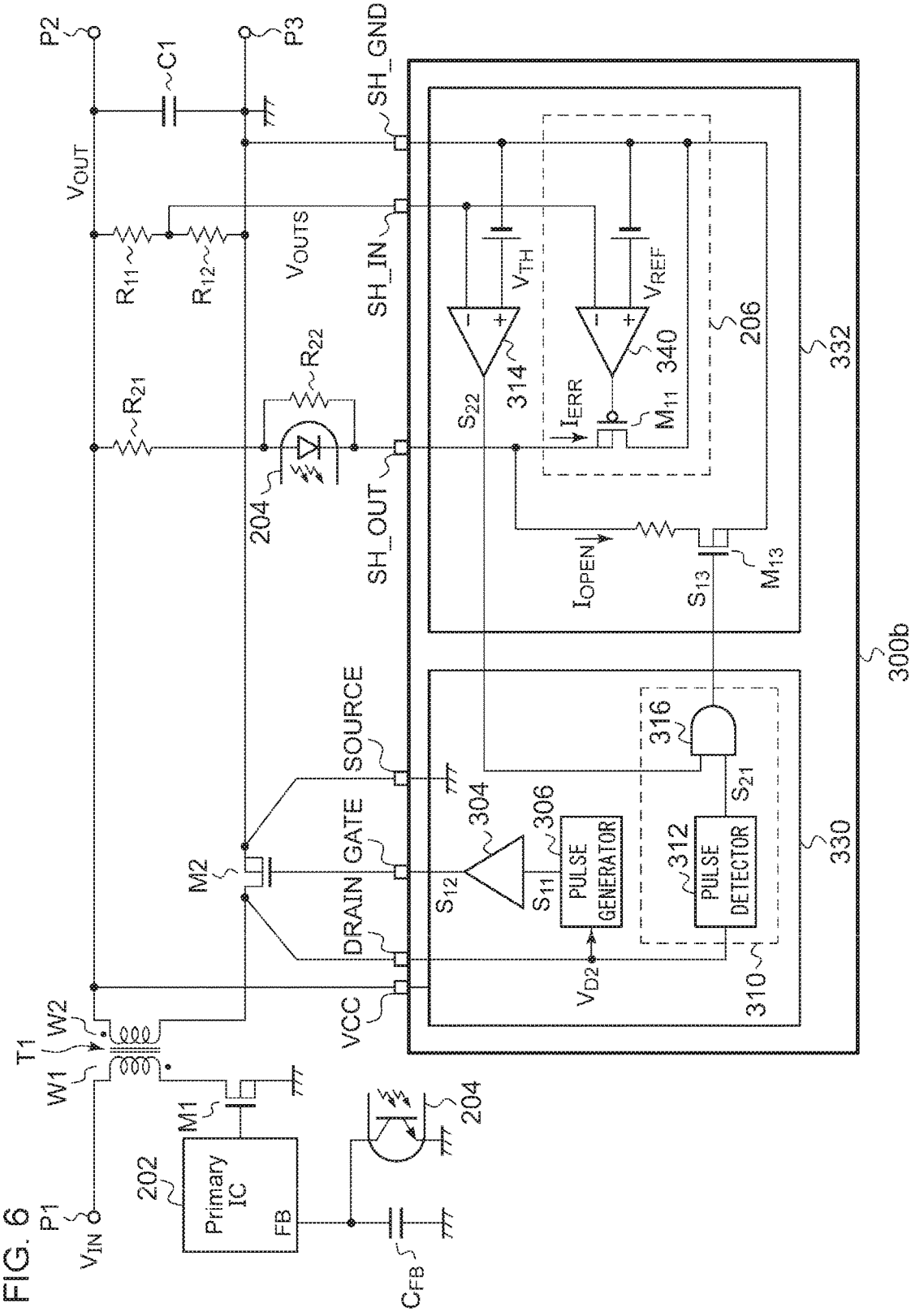
FIG. 6 is a circuit diagram showing a second example configuration of the DC/DC converter.

FIG. 6 is a circuit diagram showing a second example configuration (200b) of the DC/DC converter 200. In FIG. 6, the synchronous rectification controller 300a and the feedback circuit 206 shown in FIG. 3 are housed in a single package (synchronous rectification controller 300b). A shunt regulator output (SH_OUT) pin is coupled to the photocoupler 204. The detection voltage $V_{OUTS}$ is input to the shunt regulator input (SH_IN) pin. Furthermore, a shunt regulator ground (SH_GND) pin is grounded.

The synchronous rectification controller 300b is configured as a pair of separate chips, i.e., a first chip (synchronous rectification control chip) 330 and a second chip (shunt regulator chip) 332. The driver 304, the pulse generator 306, the pulse detector 312, and the logic gate 316 are integrated on the first chip 330. The feedback circuit 206, the comparator 314, and the transistor $M_{13}$ are integrated on the second chip 332. It should be noted that the first chip 330 and the second chip 332 may be integrated as a single chip.

The feedback circuit 206 includes an error amplifier 340 and a transistor $M_{11}$. The error amplifier 340 amplifies the difference between the detection voltage $V_{OUTS}$ and the reference voltage $V_{REF}$. The transistor $M_{11}$ is arranged on the same current path as the light-emitting element of the photocoupler 204. The control terminal (gate) of the transistor $M_{11}$ is coupled to the output of the error amplifier 340. A current $I_{ERR}$ flows through the transistor $M_{11}$ according to the difference between the detection voltage $V_{OUTS}$ and the reference voltage $V_{REF}$. The transistor $M_{13}$ is arranged in parallel with the transistor $M_{11}$.

Figure 7:
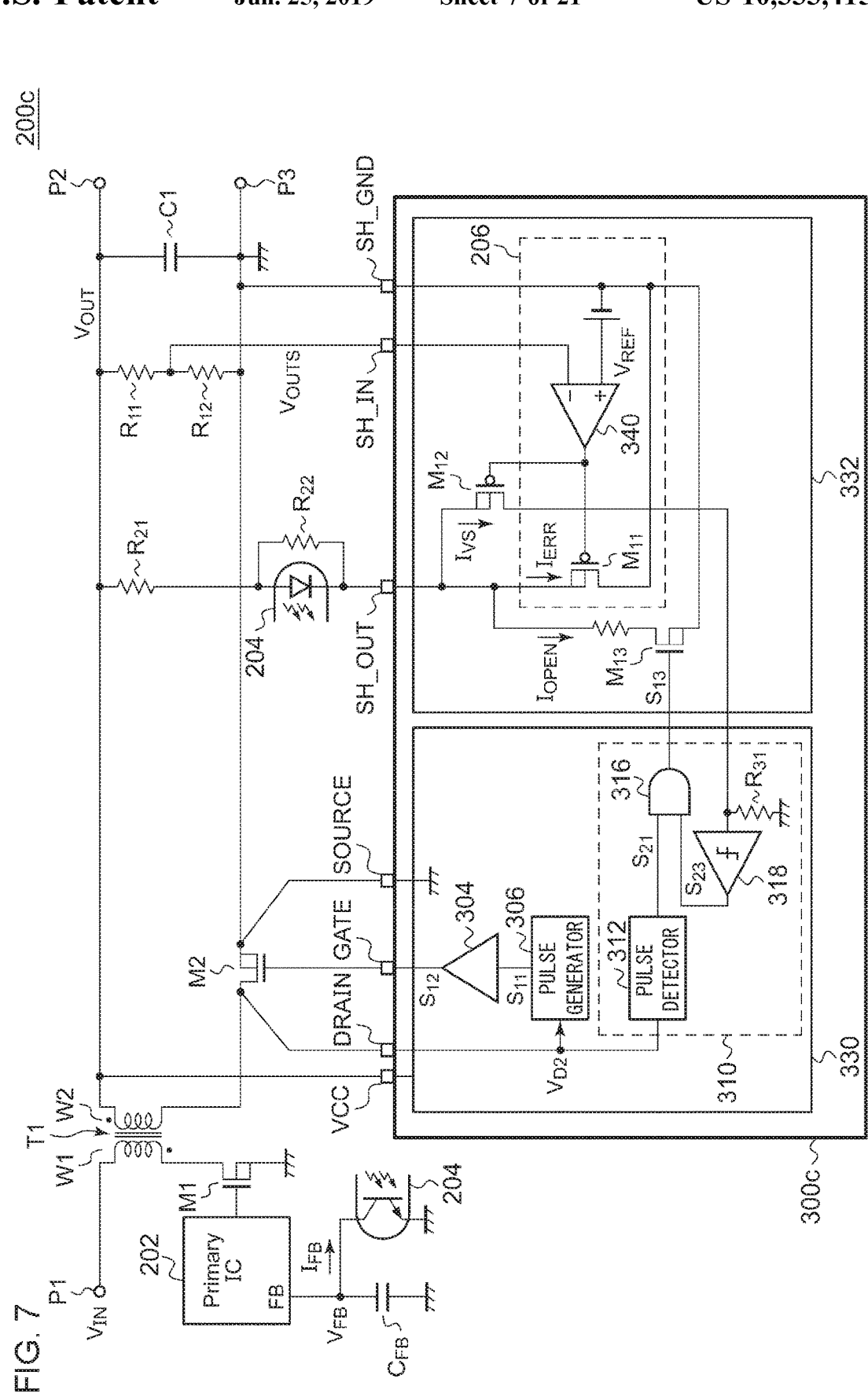
FIG. 7 is a circuit diagram showing a third example configuration of the DC/DC converter.

FIG. 7 is a circuit diagram showing a third example configuration (200c) of the DC/DC converter 200. The synchronous rectification controller 300c includes a transistor $M_{12}$ instead of the comparator 314 shown in FIG. 6. The transistor $M_{12}$ is configured as the same type as that of the transistor $M_{11}$. The transistors $M_{12}$ and $M_{11}$ are coupled so as to form a so-called current mirror circuit. A current $I_{VS}$ flows through the transistor $M_{12}$ in proportion to the current $I_{ERR}$ that flows through the transistor $M_{11}$. The current $I_{VS}$ corresponds to the output judgment signal $S_{22}$ shown in FIG. 6. When the switching transistor M1 performs switching and the output voltage $V_{OUT}$ is generated, the current $I_{VS}$ flows through the transistor $M_{12}$ (assertion). When the switching transistor M1 suspends its operation and the output voltage $V_{OUT}$ is not generated, the current $I_{VS}$ that flows through the transistor $M_{12}$ becomes zero (negation). For example, the current $I_{VS}$ may be converted into a voltage by means of a resistor $R_{31}$, so as to generate a binary signal $S_{23}$ by means of a comparator (or buffer) 318. The logic gate 316 may generate the abnormality detection signal $S_{13}$ based on the detection signal $S_{21}$ and the binary signal $S_{23}$. The resistor R31 and the comparator 318 may be provided on the second chip 332 side.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

First Modification

Figure 8:
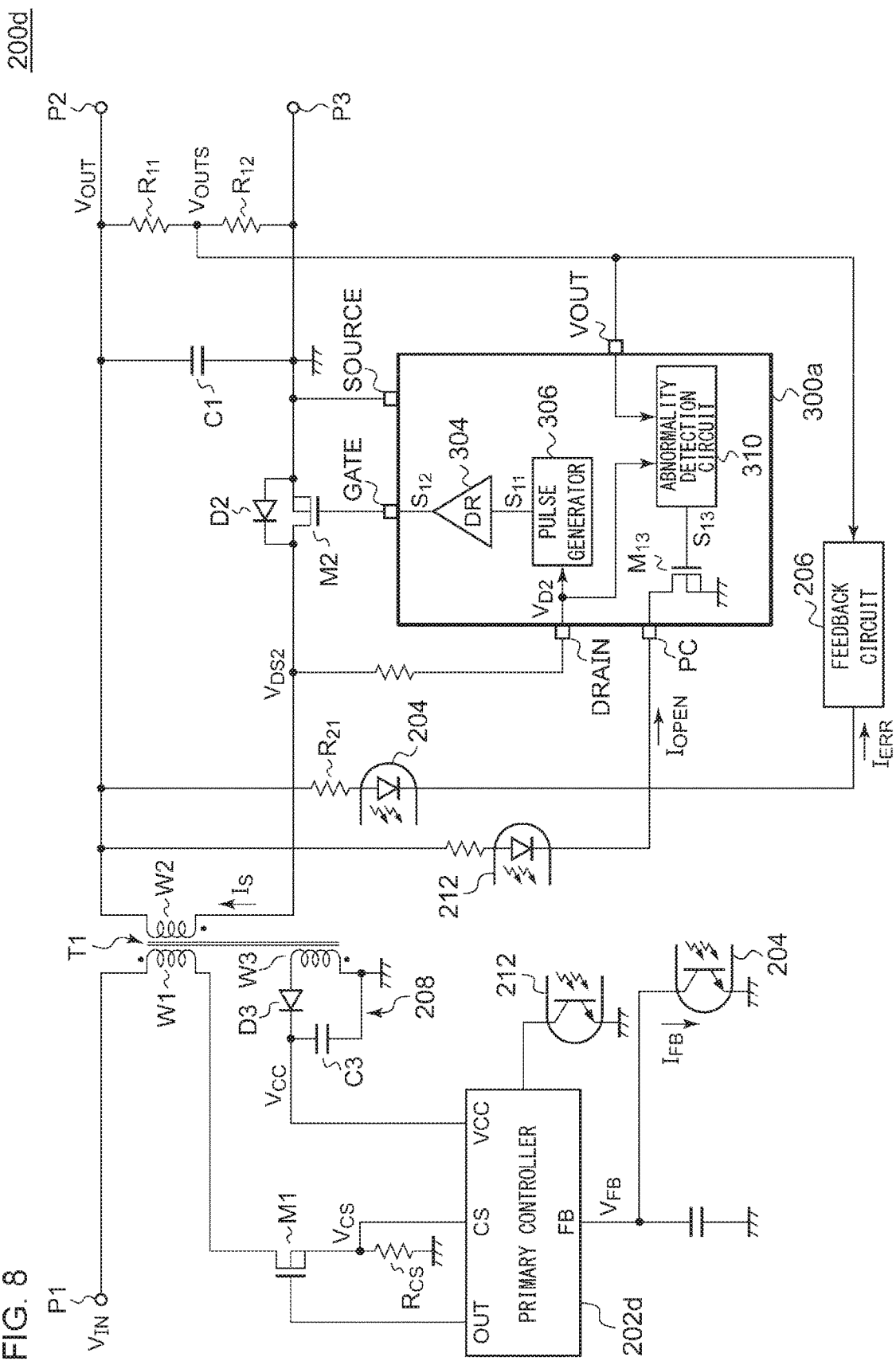
FIG. 8 is a circuit diagram showing a DC/DC converter according to a first modification.

FIG. 8 is a circuit diagram showing a DC/DC converter 200d according to a first modification. The DC/DC converter 200d includes a second photocoupler 212. The photocoupler 212 is coupled to the PC terminal of the synchronous rectification controller 300a. The primary controller 202d is coupled to a light-receiving element of the photocoupler 212. When a current that indicates the occurrence of an open-circuit fault flows through the light-receiving element, the primary controller 202d suspends the switching of the switching transistor M1. Also, a pulse transformer may be employed instead of the photocoupler 212.

Second Modification

The protection operation to be performed when such an open-circuit fault has been detected is not restricted to the suspension of the switching of the switching transistor M1. For example, when an open-circuit fault has been detected, the primary controller 202 may reduce the duty ratio of the switching of the switching transistor M1. Alternatively, in this case, the reference voltage $V_{REF}$ employed in the error amplifier 340 or a shunt regulator may be reduced.

Also, the synchronous rectification controller 300 may be provided with a fail pin so as to output the abnormality detection signal $S_{13}$ to an external circuit. For example, in a case in which a microcontroller is coupled as a load to the DC/DC converter 200, by supplying the abnormality detection signal $S_{13}$ to the microcontroller, such an arrangement allows an appropriate countermeasure to be performed for the overall system.

Third Modification

Figure 9:
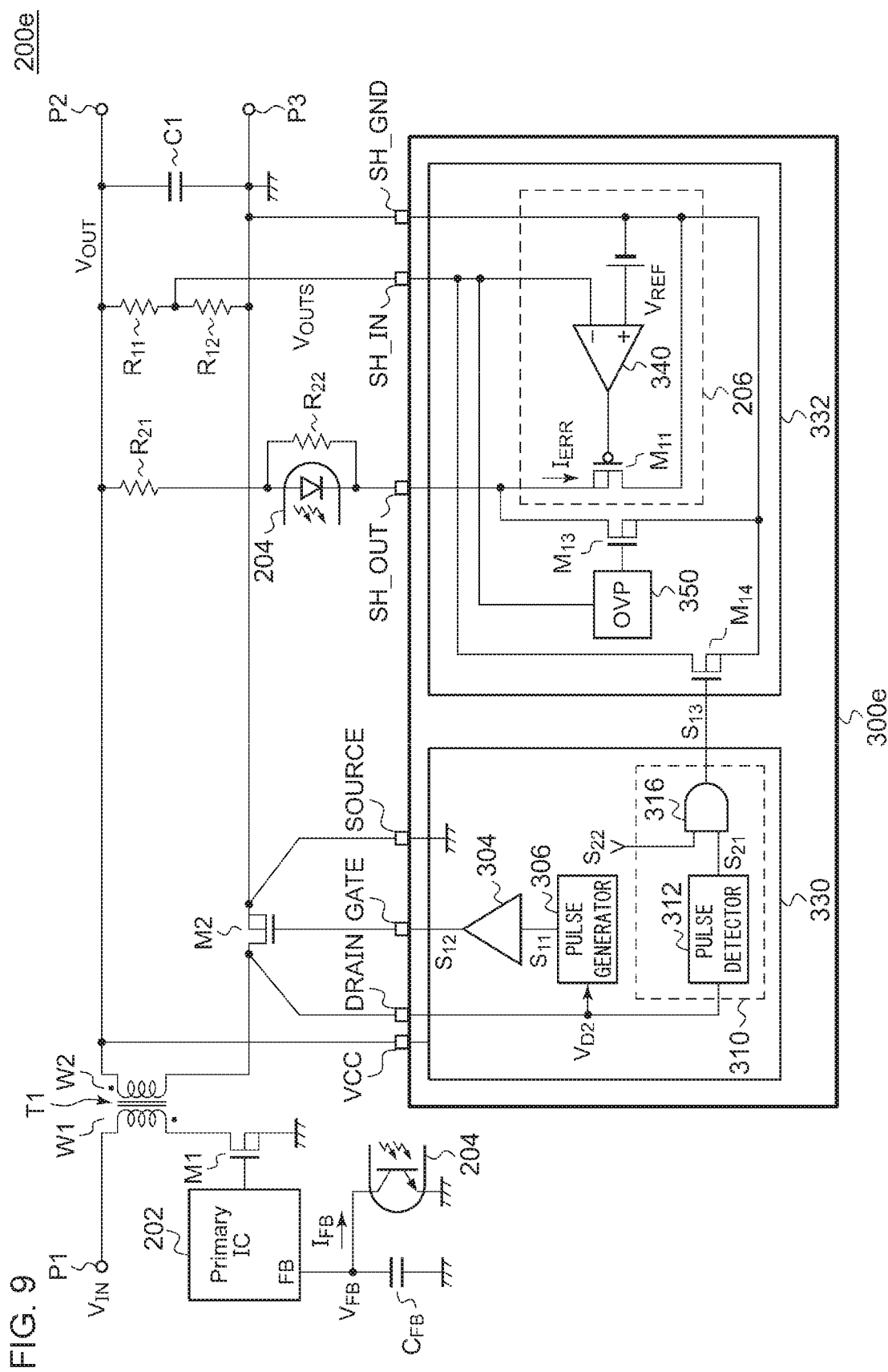
FIG. 9 is a circuit diagram showing a DC/DC converter according to a fifth modification.

FIG. 9 is a circuit diagram showing a DC/DC converter 200e according to a third modification.

The DC/DC converter 200e is provided with an overvoltage protection (OVP) function. When the output voltage $V_{OUT}$ exceeds a threshold value $V_{OVP1}$, the DC/DC converter 200e suspends the switching of the switching transistor M1. As a result of discharge of the output capacitor C1, when the output voltage $V_{OUT}$ becomes lower than an OVP clear voltage $V_{OVP2}$, the DC/DC converter 200e restarts the switching of the switching transistor M1.

Related to the OVP function, the synchronous rectification controller 300e includes an OVP circuit 350 as a built-in component. Upon detecting that $V_{OUT} > V_{OVP1}$, the OVP circuit 350 drives the light-emitting element of the photocoupler 204. For example, the OVP circuit 350 may turn on the transistor $M_{13}$ coupled to the photocoupler 204, so as to supply a current $I_{OVP}$ to the light-emitting element of the photocoupler 204. Also, the transistor $M_{13}$ may be omitted. With such an arrangement, the OVP circuit 350 may turn on the transistor $M_{11}$ regardless of the output of the error amplifier 340.

In this case, the feedback current $I_{FB}$ on the primary side is increased, which lowers the feedback signal $V_{FB}$, thereby suspending the switching of the switching transistor M1. Upon detecting that $V_{OUT} < V_{OVP2}$, the OVP circuit 350 restarts the switching of the switching transistor M1. The detection method for detecting the OVP state is not restricted in particular. For example, the detection voltage $V_{OUTS}$ may be monitored. Also, the current $I_{ERR}$, which is used by the feedback circuit 206 to drive the photocoupler 204, may be monitored.

The primary controller 202 may include an OVP circuit as a built-in component instead of or otherwise in addition to the OVP circuit 350 included in the synchronous rectification controller 300e. The power supply voltage $V_{CC}$ generated on the primary side is proportional to the output voltage $V_{OUT}$. Accordingly, when $V_{CC} > V_{OVP3}$, the OVP circuit included in the primary controller 202 may suspend the switching of the switching transistor M1. Also, when $V_{CC} < V_{OVP4}$, the OVP circuit may restart the switching of the switching transistor M1. The relation $V_{OVP4} < V_{OVP3}$ holds true.

The synchronous rectification controller 300e uses the OVP function so as to protect the circuit against an open-circuit fault state. Specifically, when the abnormality detection signal $S_{13}$ is asserted, the synchronous rectification controller 300e forcibly lowers (pulls down) the input of the shunt regulator, i.e., forcibly lowers the detection voltage $V_{OUTS}$. For example, when the abnormality detection signal $S_{13}$ is asserted, the synchronous rectification controller 300e may turn on a transistor $M_{14}$ arranged between the SH_IN pin and the SH_GND pin.

Next, description will be made regarding the operation of the DC/DC converter 200e.

When an open-circuit fault of the DRAIN pin has occurred, the abnormality detection circuit 310 asserts the abnormality detection signal $S_{13}$ so as to lower the voltage at the SH_IN pin. This reduces the current $I_{ERR}$ supplied to the photocoupler 204, which raises the feedback signal $V_{FB}$. This raises the duty ratio of the switching of the switching transistor M1, which causes an increase in the output voltage $V_{OUT}$. That is to say, an overvoltage state is intentionally generated.

Eventually, when the relation $V_{OUT} > V_{OVP1}$ becomes true, the switching of the switching transistor M1 is suspended by the OVP circuit 350 (and/or the OVP circuit included in the primary controller 202).

Subsequently, when the OVP state is cleared as a result of reduction in the output voltage $V_{OUT}$, the switching of the switching transistor M1 is restarted. When the abnormality detection circuit 310 asserts the abnormality detection signal $S_{13}$ again, the overvoltage state is generated, and accordingly, the switching of the switching transistor M1 is suspended. The DC/DC converter 200e repeats this operation.

As described above, when an open-circuit fault has occurred, the DC/DC converter 200e shown in FIG. 9 performs an intermittent operation in which the operation period and the suspension period are alternately continued. By designing the suspension period such that it matches the same time scale as that of the relaxing time required to release the heat generated in the synchronous rectification transistor M2, such an arrangement is capable of preventing the abnormal generation of heat from occurring in the synchronous rectification transistor M2.

Fourth Modification

Description has been made in the embodiment regarding an arrangement in which the pulse detector 312 detects whether or not a cyclic signal has occurred at the DRAIN terminal. However, the present invention is not restricted to such an arrangement. Also, the pulse detector 312 may monitor the GATE terminal or otherwise the output of the pulse generator 306 instead of the DRAIN terminal. That is to say, when the pulse signal $S_{11}$ is maintained at a predetermined level and the output voltage $V_{OUT}$ is generated, judgment may be made that an open-circuit fault has occurred.

Fifth Modification

The synchronous rectification transistor M2 may be arranged on the electric potential side that is higher than that of the secondary winding W2.

Sixth Modification

Figure 10:
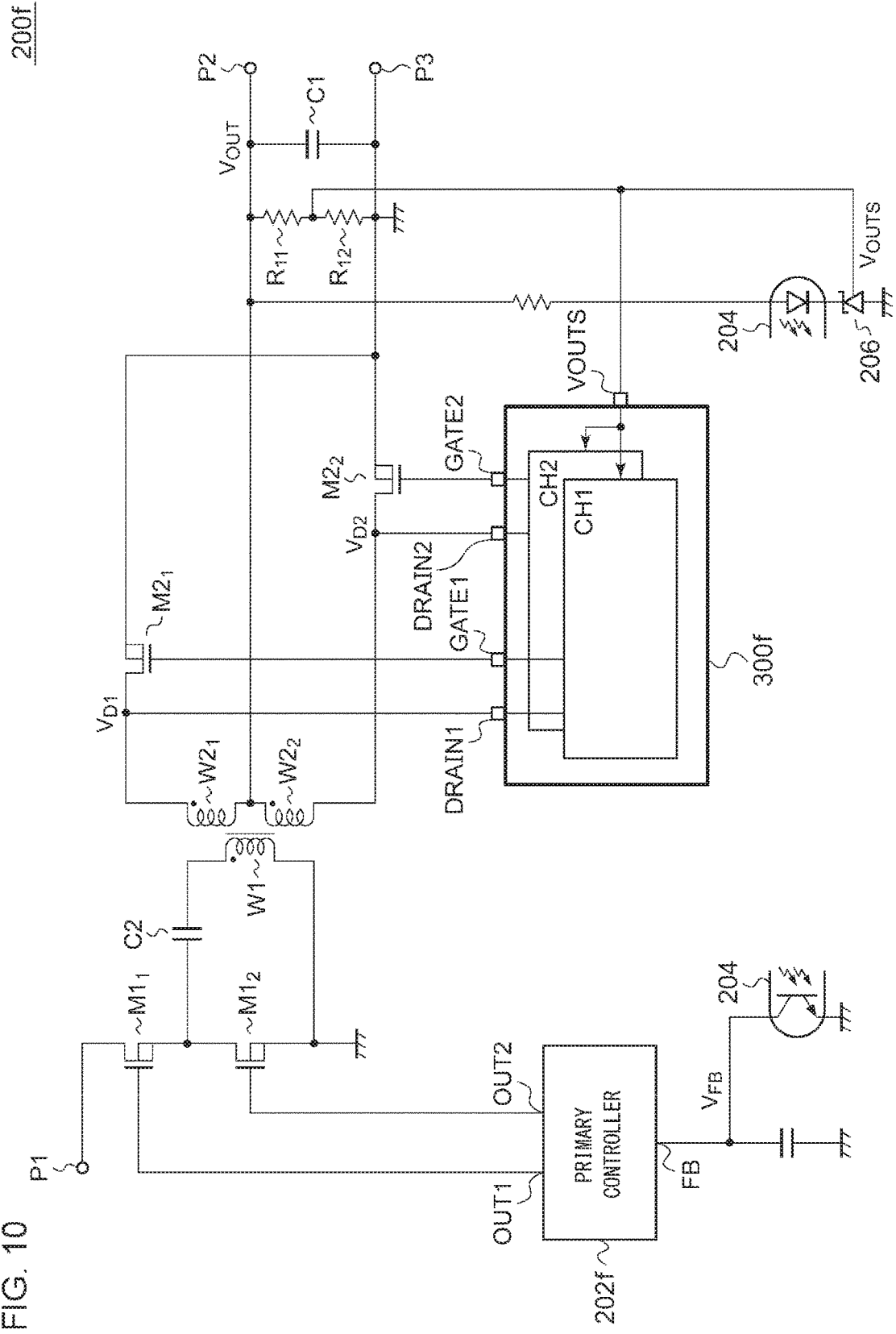
FIG. 10 is a circuit diagram showing a DC/DC converter according to a sixth embodiment.
Figure 11:
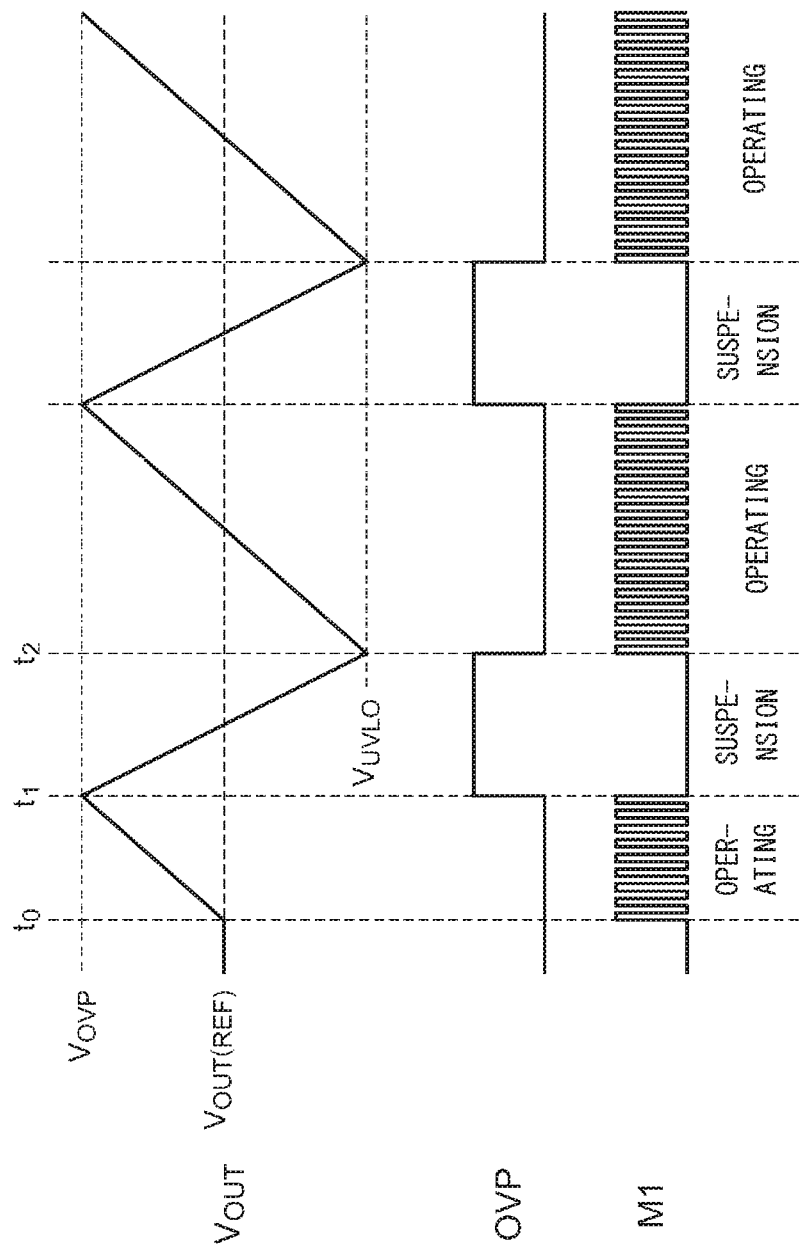
FIG. 11 is an operation waveform diagram showing the operation of the DC/DC converter shown in FIG. 1B.

Description has been made in the embodiment regarding a flyback converter as an example. Also, the present invention is applicable to an LLC converter. FIG. 10 is a circuit diagram showing a DC/DC converter 200f according to a sixth modification. Switching transistors $M1_1$ and $M1_2$ and a resonance capacitor C2 are provided on the primary side. A primary controller 202f drives the transistor $M1_1$ and $M1_2$ according to the feedback signal $V_{FB}$. The primary controller 202f may be configured using known techniques.

The transformer T1 includes secondary windings $W2_1$ and $W2_2$. A pair of synchronous rectification transistors $M2_1$ and $M2_2$ are provided on the secondary side. The synchronous rectification controller 300f drives the synchronous rectification transistor $M2_1$ according to the drain voltage $V_{D1}$ of the synchronous rectification transistor $M2_1$, and drives the synchronous rectification transistor $M2_2$ according to the drain voltage $V_{D2}$ of the synchronous rectification transistor $M2_2$. The synchronous rectification controller 300f includes the aforementioned synchronous rectification controllers 300 for supporting two channels (CH1 and CH2).

The channel CH1 is provided with a circuit that detects the occurrence of an open-circuit fault of the DRAIN1 pin. The channel CH2 is provided with a circuit that detects the occurrence of an open-circuit fault of the DRAIN2 pin. As a method for detecting the occurrence of an open-circuit fault, the aforementioned techniques may be employed.

In the case of an LLC converter, the occurrence of an open-circuit fault can be detected without monitoring the detection voltage $V_{OUTS}$ that corresponds to the output voltage $V_{OUT}$. During the suspension of the operation of the DC/DC converter 200f, i.e., when the switching of the primary-side switching transistors $M_{11}$ and $M_{12}$ is suspended, a cyclic signal is not generated at both the DRAIN1 pin and the DRAIN2 pin. Let us consider a case in which an open-circuit fault state of the DRAIN1 pin occurs in the operation of the DC/DC converter 200e. In this case, a cyclic signal occurs at the DRAIN2 pin.

Thus, the DRAIN1 pin and the DRAIN2 pin may be monitored. When a cyclic signal has occurred at only one of the DRAIN pins, judgement may be made that an open-circuit fault has occurred.

Second Embodiment

Figure 12:
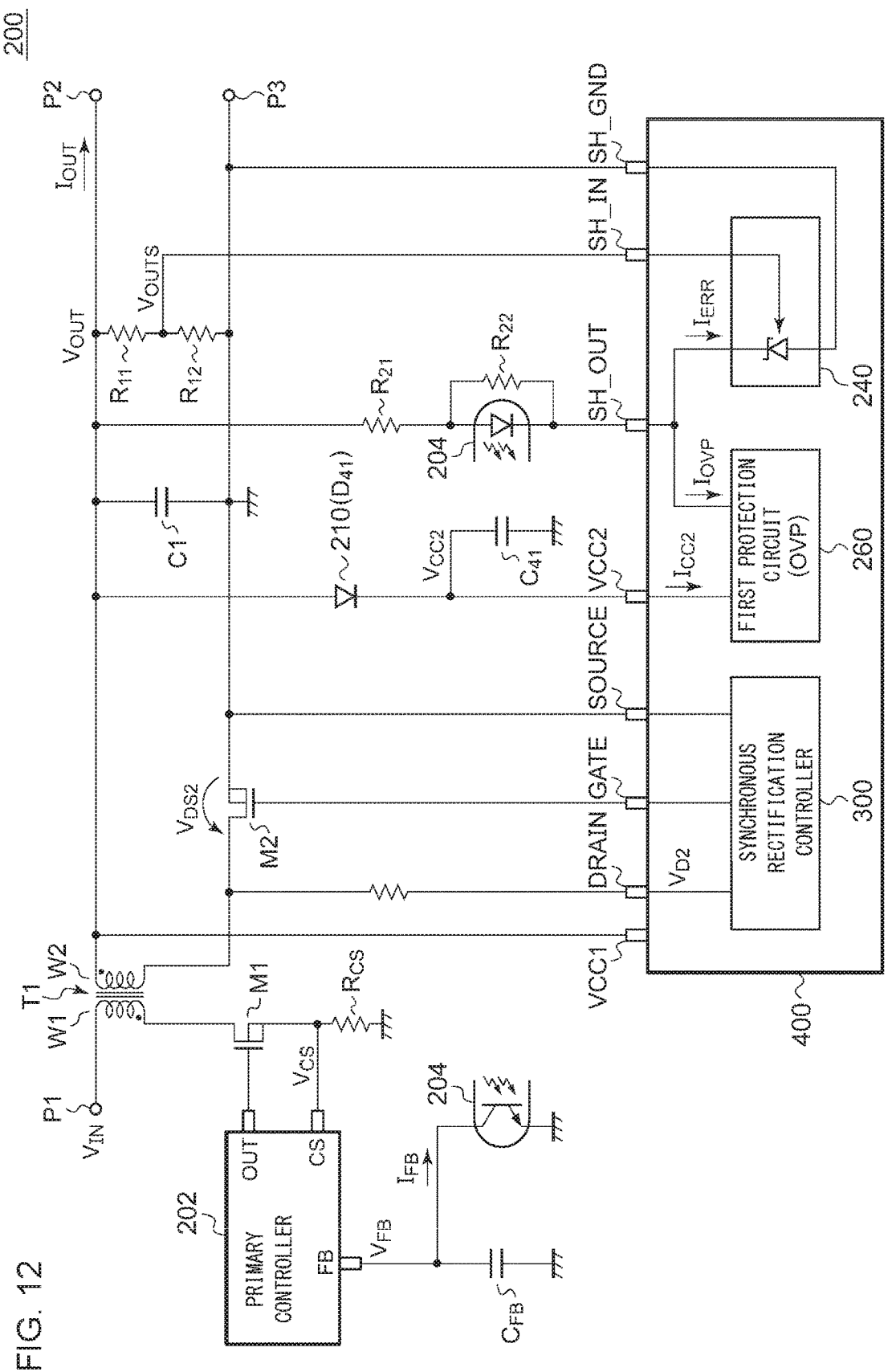
FIG. 12 is a circuit diagram showing an insulated DC/DC converter according to a second embodiment.

FIG. 12 is a circuit diagram showing an insulated DC/DC converter 200 according to a second embodiment. The DC/DC converter 200 is a flyback converter. The DC/DC converter 200 is configured to receive an input voltage $V_{IN}$ via its input terminal P1, to generate a DC output voltage $V_{OUT}$ stabilized to a predetermined target voltage, and to supply the output voltage $V_{OUT}$ to a load (not shown) coupled between an output terminal P2 and a ground terminal P3.

A transformer T1 includes a primary winding W1 and a secondary winding W2. One end of the primary winding W1 is coupled to the input terminal P1 so as to receive the DC input voltage $V_{IN}$. The drain of a switching transistor M1 is coupled to the other end of the primary winding W1 of the transformer T1. A sensing resistor $R_{CS}$ for current detection is arranged between the source of the switching transistor M1 and the ground line.

A synchronous rectification transistor M2 and the secondary winding W2 of the transformer T1 are arranged in series between the output terminal P2 and a ground terminal P3. An output capacitor C1 is coupled between the output terminal P2 and the ground terminal P3.

A photocoupler 204 includes a light-emitting element and a light-receiving element. The light-emitting element is biased by means of resistors $R_{21}$ and $R_{22}$. A feedback circuit 240 drives the light-emitting element of the photocoupler 204 such that the output voltage $V_{OUT}$ of the DC/DC converter 200 approaches a target voltage $V_{OUT(REF)}$. For example, the feedback circuit 240 receives, via its control input (SH_IN) pin, a detection voltage $V_{OUTS}$ obtained by dividing the output voltage $V_{OUT}$ by means of the resistors $R_{11}$ and $R_{12}$. Furthermore, the feedback circuit 240 drives the light-emitting element of the photocoupler 204 using a current $I_{ERR}$ that corresponds to the difference between the detection voltage $V_{OUTS}$ and its target voltage $V_{REF}$.

The primary controller 202 is coupled to the light-receiving element of the photocoupler 204. A feedback signal $V_{FB}$ occurs at a feedback (FB) terminal of the primary controller 202 according to a feedback current $I_{FB}$ that flows through the light-receiving element of the photocoupler 204. Furthermore, a current detection signal $V_{CS}$ that occurs at the sensing resistor $R_{CS}$ is input to a current detection (CS) terminal of the primary controller 202.

The primary controller 202 generates a pulse signal having a duty ratio (or frequency) that corresponds to the feedback signal $V_{FB}$, and outputs the pulse signal thus generated via its output (OUT) terminal, so as to drive the switching transistor M1. The configuration and the control method employed in the primary controller 202 are not restricted in particular. For example, the primary controller 202 may be configured as a current-mode modulator. In this case, the duty ratio of the pulse signal is adjusted according to the current detection signal $V_{CS}$.

The synchronous rectification controller 300 controls the synchronous rectification transistor M2. The synchronous rectification transistor M2 has an unshown body diode. For example, the synchronous rectification controller 300 generates a control pulse according to the drain-source voltage $V_{DS2}$ of the synchronous rectification transistor M2, and supplies a gate pulse that corresponds to the control pulse to the gate of the synchronous rectification transistor M2.

Upon detecting an abnormality, a first protection circuit 260 maintains a driving state in which a current is supplied to the light-emitting element of the photocoupler 204. The abnormality is not restricted in particular. Description will be made in the present embodiment regarding an example in which the abnormality is an overvoltage state. The first protection circuit 260 is an OVP circuit configured to supply a current $I_{OVP}$ to the photocoupler 204 when an overvoltage state has been detected.

A secondary controller 400 includes the synchronous rectification controller 300, the feedback circuit 240, and the first protection circuit 260, which are housed in a single package. The secondary controller 400 includes a drain (DRAIN) pin, source (SOURCE) pin, gate (GATE) pin, first power supply (VCC1) pin, second power supply (VCC2) pin, SH_IN pin, SH_OUT pin, and SH_GND pin.

The SOURCE pin is configured as a ground terminal of the synchronous rectification controller 300. The GATE pin and the DRAIN pin are coupled to the gate and the drain of the synchronous, respectively, of the synchronous rectification transistor M2. The VCC1 pin is configured as a power supply pin of the synchronous rectification controller 300. The output voltage $V_{OUT}$ is supplied to the VCC1 pin. The detection voltage $V_{OUTS}$ that corresponds to the output voltage $V_{OUT}$ is input to the SH_IN pin. The SH_GND pin is coupled to the ground terminal (ground line) P3. The SH_OUT pin is coupled to the light-emitting element of the photocoupler 204.

The synchronous rectification controller 300 drives the synchronous rectification transistor M2 based on a voltage $V_{D2}$ at the DRAIN pin (drain-source voltage $V_{DS2}$ of the synchronous rectification transistor M2).

The first protection circuit 260 operates receiving an auxiliary power supply voltage $V_{CC2}$ received via a VCC2 pin. In the suspension state of the DC/DC converter 200, the auxiliary power supply voltage $V_{CC}$ falls at a slower rate than that of the output voltage $V_{OUT}$ (power supply voltage $V_{CC1}$). For example, the DC/DC converter 200 includes a power supply capacitor $C_{41}$ coupled to the VCC2 pin and a charger path 210 for charging the power supply capacitor $C_{41}$ via the output line. The voltage $V_{CC2}$ stored in the power supply capacitor $C_{41}$ is supplied to the VCC2 pin.

The charger path 210 may include a rectifier element that allows a current to flow from the output line of the DC/DC converter 200 to the power supply capacitor $C_{41}$, and that blocks a current in the reverse direction. The rectifier element may be a diode $D_{41}$ arranged such that its anode is coupled to the output line side of the DC/DC converter 200, and its cathode is coupled to the power supply capacitor $C_{41}$ side. Also, the rectifier element may be a switch (transistor).

Figure 13:
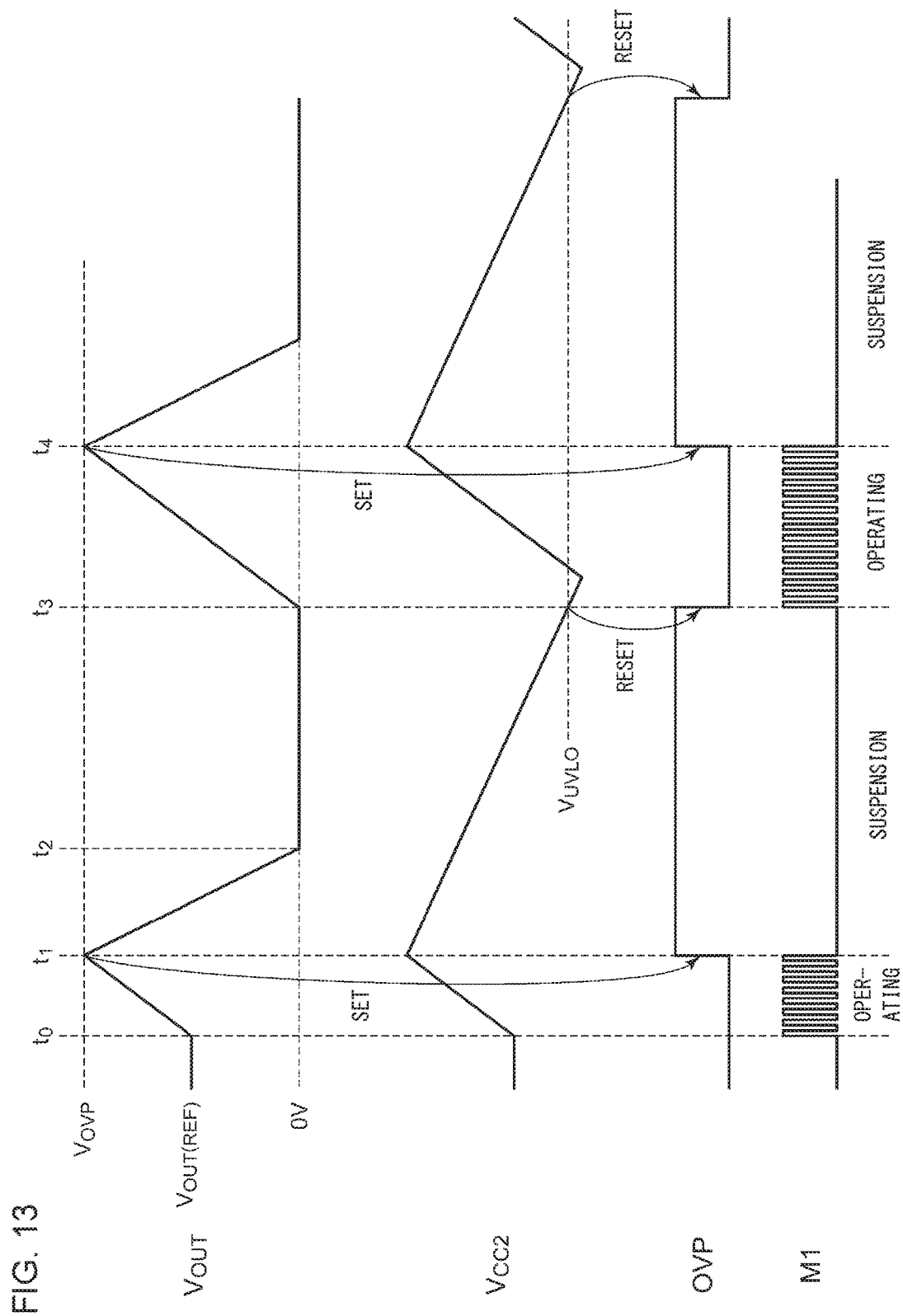
FIG. 13 is an operation waveform diagram showing the operation of the DC/DC converter shown in FIG. 12.

The above is the configuration of the DC/DC converter 200. Next, description will be made regarding the operation thereof. FIG. 13 is an operation waveform diagram showing the operation of the DC/DC converter 200 shown in FIG. 12.

In the normal state before the time point $t_0$, the output voltage $V_{OUT}$ is stabilized to its target value $V_{OUT(REF)}$. A fault of some kind occurs at the time point $t_0$. Subsequently, the output voltage $V_{OUT}$ deviates and starts to rise from the target value $V_{OUT(REF)}$.

When the output voltage $V_{OUT}$ exceeds the overvoltage threshold $V_{OVP}$ at the time point $t_1$, the first protection circuit 260 enters a state in which it supplies the current $I_{OVP}$ to the light-emitting element of the photocoupler 204, and this state is fixed (latched). As a result, the feedback current $I_{FB}$ increases, which lowers the feedback signal $V_{FB}$, thereby suspending the switching of the switching transistor M1.

After the switching of the switching transistor M1 is suspended, the output capacitor C1 is discharged via a load current $I_{OUT}$. Accordingly, the output voltage $V_{OUT}$ falls with time. Eventually, at the time point $t_2$, the output voltage $V_{OUT}$ becomes zero.

In contrast, the power supply capacitor $C_{41}$ is not discharged via the load current $I_{OUT}$. Accordingly, the auxiliary power supply voltage $V_{CC2}$ falls at a slower rate than that of the output voltage $V_{OUT}$. The falling rate corresponds to the capacitance of the power supply capacitor $C_{41}$ and the operating current $I_{CC2}$ required for the first protection circuit 260.

When the auxiliary power supply voltage $V_{CC2}$ falls and becomes lower than a predetermined voltage level (e.g., threshold value $V_{UVLO}$) at the time point $t_3$, the first protection circuit 260 is reset, and the current $I_{OVP}$ becomes zero. The secondary controller 400 may include a UVLO circuit (not shown) that compares the auxiliary power supply voltage $V_{CC2}$ with a threshold value $V_{UVLO}$. Subsequently, the switching of the switching transistor M1 restarts, and accordingly, the output voltage $V_{OUT}$ starts to rise.

In a case in which a cause of the overvoltage state remains, the output voltage $V_{OUT}$ reaches the overvoltage threshold value $V_{OVP}$ again at the time point $t_4$. Subsequently, the DC/DC converter 200 alternately repeats the operation and the suspension in a time sharing manner (intermittent mode).

The above is the operation of the DC/DC converter 200. In the intermittent mode, the DC/DC converter 200 provides a suspension period that is longer than that provided by conventional techniques. As described above, in the operating period, the circuit element generates heat, leading to an increase in its temperature. In the suspension period, the temperature is relaxed. Accordingly, by providing an increased suspension period, such an arrangement is capable of suppressing such an increase in the temperature of the circuit element.

Such an arrangement allows the suspension period to be designed based on the capacitance value of the power supply capacitor $C_{41}$ regardless of the falling rate of the output voltage $V_{OUT}$ such that the temperature is maintained in an appropriate temperature range.

The present invention encompasses various kinds of apparatuses and circuits that can be regarded as a block configuration or a circuit configuration shown in FIG. 12, or otherwise that can be derived from the aforementioned description. That is to say, the present invention is not restricted to a specific configuration. More specific description will be made below regarding an example configuration for clarification and ease of understanding of the essence of the present invention and the circuit operation. That is to say, the following description will by no means be intended to restrict the technical scope of the present invention.

Figure 14:
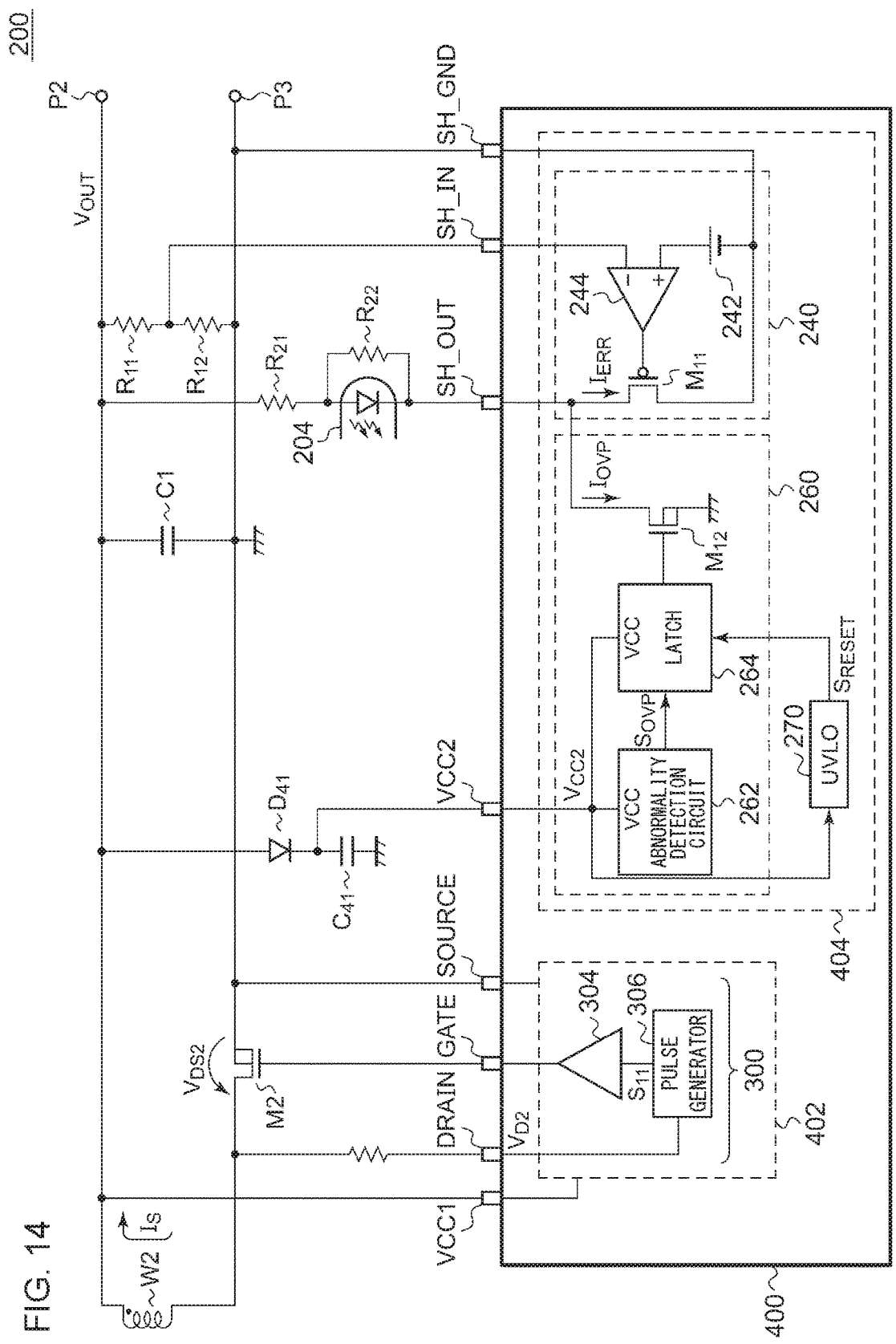
FIG. 14 is a circuit diagram showing an example configuration of a secondary controller.

FIG. 14 is a circuit diagram showing an example configuration of the secondary controller 400. The synchronous rectification controller 300 is integrated on a first chip 402. The feedback circuit 240 and the first protection circuit 260 are integrated on a second chip (shunt regulator IC) 404. The first chip 402 and the second chip 404 respectively employ independent (isolated) power supply planes. Furthermore, the first chip 402 and the second chip 404 respectively employ independent ground planes. For example, the first chip 402 employs, as the power supply, the output voltage $V_{OUT}$ supplied to the VCC1 pin. The voltage at the VCC1 pin may be supplied to a part of the components on the second chip 404.

The synchronous rectification controller 300 includes a driver 304 and a pulse generator 306. The pulse generator 306 generates a control pulse $S_{11}$ based on the voltage $V_{D2}$ at the DRAIN pin. The configuration and the control method employed in the pulse generator 306 are not restricted in particular. That is to say, known techniques may be employed. For example, the pulse generator 306 detects, based on the voltage $V_{D2}$ at the DRAIN pin, the turning off of the switching transistor M1 and the zero-current state in which the current $I_S$ that flows through the secondary winding W2 becomes substantially zero. The pulse generator 306 switches the pulse signal $S_{11}$ to the on level according to the turning off of the switching transistor M1 as a trigger. Furthermore, the pulse generator 306 switches the pulse signal $S_{11}$ to the off level according to the zero-current state as a trigger.

When a voltage comparator detects a crossing of the voltage $V_{D2}$ and a predetermined first threshold voltage $V_{THA}$ having a negative value (e.g., −150 mV), judgment may be made that the switching transistor M1 has been turned off.

During the on period of the synchronous rectification transistor M2, a current $I_S$ flows from the source to the drain of the synchronous rectification transistor M2. In this state, the drain-source voltage $V_{DS2}$ ($V_{D2}$) becomes a negative voltage having an absolute value that is proportional to the amount of the current $I_S$.

$$V_{DS2}=I_S \times R_{ON2}$$

Here, $R_{ON2}$ represents the on resistance of the synchronous rectification transistor M2. Thus, a voltage comparator may be provided to compare the drain voltage $V_{D2}$ with a second threshold voltage $V_{THB}$ set to a negative value in the vicinity of zero (e.g., −10 mV). When the drain voltage $V_{D2}$ becomes higher than the second threshold voltage $V_{THB}$, judgment may be made that the zero-current state has occurred. The driver 304 drives the synchronous rectification transistor M2 based on the control pulse $S_{11}$.

The feedback circuit 240 is a shunt regulator, and includes a reference voltage source 242, an error amplifier 244, and a transistor $M_{11}$. The reference voltage source 242 generates a reference voltage $V_{REF}$. The error amplifier 244 amplifies the difference between the detection voltage $V_{OUTS}$ and the reference voltage $V_{REF}$. The transistor $M_{11}$ is arranged between the SH_OUT pin and the SH_GND pin, i.e., on the same current path as the light-emitting element of the photocoupler 204. The control terminal (gate) of the transistor $M_{11}$ is coupled to the output of the error amplifier 244. A current $I_{ERR}$ that corresponds to the difference between the detection voltage $V_{OUTS}$ and the reference voltage $V_{REF}$ flows through the transistor $M_{11}$.

The first protection circuit 260 includes an abnormality detection circuit 262, a latch circuit 264, and a transistor $M_{12}$. Upon detecting an abnormality, i.e., when the output voltage $V_{OUT}$ exceeds the overvoltage threshold value $V_{OVP1}$, the abnormality detection circuit 262 asserts (set to the high level, for example) an abnormality detection signal (overvoltage detection signal) $S_{OVP}$. The overvoltage detection method and the configuration of the detection circuit are not restricted in particular. For example, the abnormality detection circuit 262 may compare the detection voltage $V_{OUTS}$ input to the SH_IN pin with a threshold value that corresponds to the overvoltage threshold value $V_{OVP1}$. Alternatively, based on the fact that the current $I_{ERR}$ that flows to the SH_OUT pin becomes greater as the output voltage $V_{OUT}$ becomes higher, the abnormality detection circuit 262 may detect the overvoltage state based on the current $I_{ERR}$ that flows through the transistor $M_{11}$. Also, the abnormality detection circuit 262 may detect the overvoltage state based on the voltage at the SH_OUT pin or otherwise the voltage at the VCC1 pin.

The latch circuit 264 enters the set state in response to the assertion of the overvoltage detection signal $S_{OVP}$. In the set state, the output of the latch circuit 264 (gate voltage of the transistor $M_{12}$) is fixed to the high level. In the set state of the latch circuit 264, the transistor $M_{12}$ is turned on, which causes the current $I_{OVP}$ to flow.

When the auxiliary power supply voltage $V_{CC2}$ becomes lower than the clear voltage $V_{UVLO}$, the abnormality detection circuit 262 negates (set to the low level) the OVP signal $S_{OVP}$ so as to reset the latch circuit 264, thereby turning off the transistor $M_{12}$. For example, a UVLO circuit (reset circuit) 270 may be provided in order to monitor the power supply voltage $V_{CC2}$. When $V_{CC2}$ becomes lower than $V_{UVLO}$, the UVLO circuit 270 may assert a reset signal $S_{RESET}$ so as to reset the latch circuit 264.

The auxiliary power supply voltage $V_{CC2}$ at the VCC2 pin is supplied to at least the latch circuit 264 from among the components included in the first protection circuit 260. This allows the latch circuit 264 to maintain its set state while the auxiliary power supply voltage $V_{CC2}$ remains, even after the output voltage $V_{OUT}$ falls. Also, the power supply voltage $V_{CC2}$ may be supplied to all the internal circuit components of the second chip 404.

The above is an example configuration of the secondary controller 400. The secondary controller 400 supports the circuit operation shown in FIG. 13.

Next, description will be made regarding modifications of the secondary controller 400 shown in FIG. 14.

Seventh Modification

The synchronous rectification controller 300, the first protection circuit 260, and the feedback circuit 240 may be integrated on a single chip, and may employ a common ground plane. In this case, the VCC1 pin may be omitted. With such an arrangement, the power supply voltage $V_{CC2}$ at the VCC2 pin may be supplied to all of the synchronous rectification controller 300, the feedback circuit 240, and the first protection circuit 260. This allows the number of pins required for the secondary controller 400 to be reduced.

Alternatively, the first chip 402 (which is also referred to as the "synchronous rectification control IC") and the second chip 404 (shunt regulator IC) may be respectively housed in separate packages.

Eighth Modification

Description has been made with reference to FIG. 14 regarding an arrangement in which the latch circuit 264 is reset by means of the UVLO circuit 270. However, the present invention is not restricted to such an arrangement. For example, the latch circuit 264 may be configured to support a timer function. With such an arrangement, after the assertion of the abnormality detection signal (overvoltage detection signal) $S_{OVP}$, the latch circuit 264 may be automatically reset after a predetermined period of time elapses (which corresponds to the suspension period shown in FIG. 13).

Ninth Modification

The first protection circuit 260 is not restricted to such an overvoltage protection circuit. For example, the first protection circuit 260 may detect a switching-incapable state in which the synchronous rectification transistor M2 is not able to perform switching. Specifically, upon detecting the switching-incapable state, the first protection circuit 260 may enter the set state so as to drive the light-emitting element of the photocoupler 204. For example, the first protection circuit 260 may detect an open-circuit fault of the GATE pin of the secondary controller 400. Also, the first protection circuit 260 may detect an open-circuit fault of the DRAIN pin of the secondary controller 400.

Third Embodiment

Figure 15:
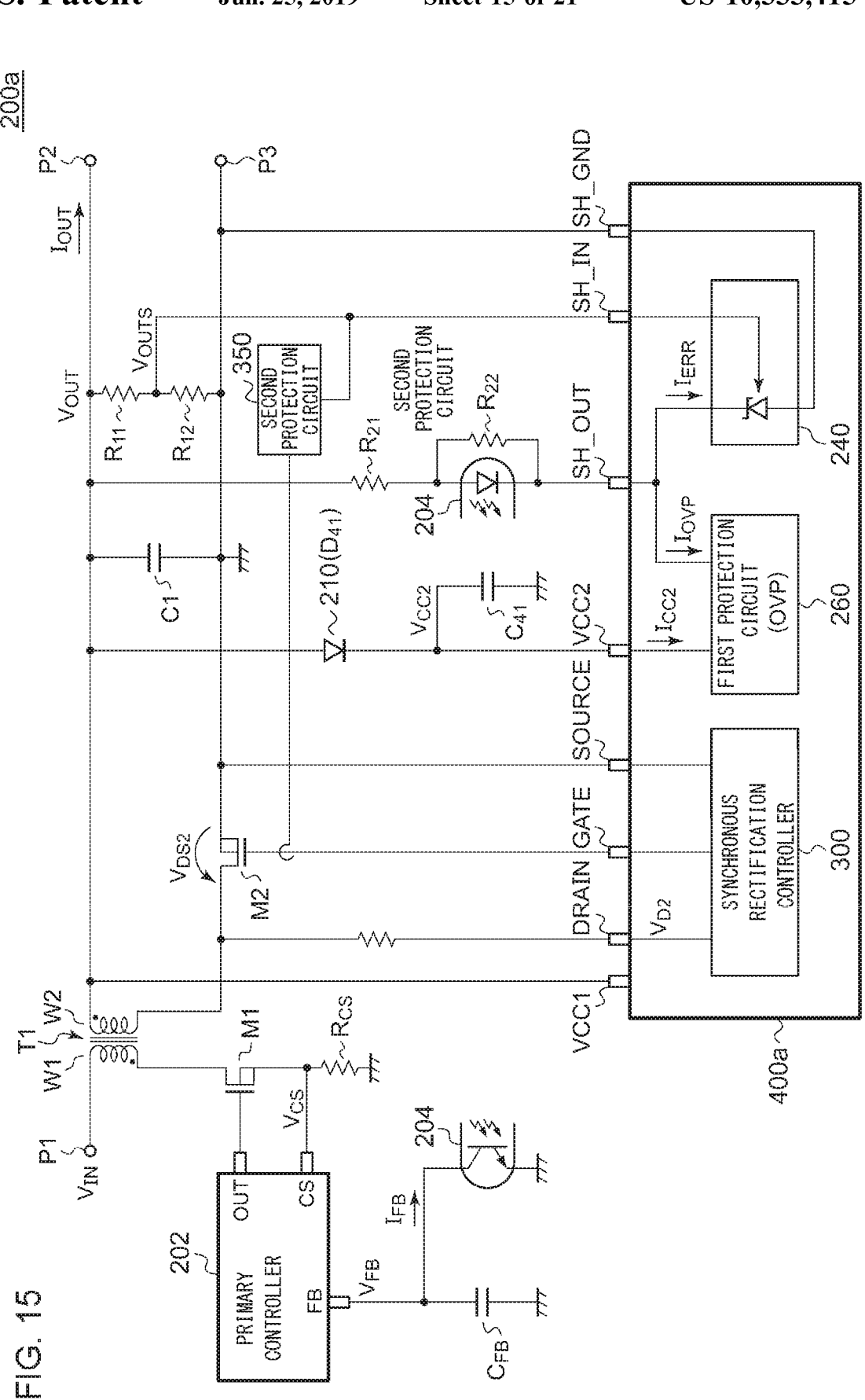
FIG. 15 is a circuit diagram showing a DC/DC converter according to a third embodiment.

FIG. 15 is a circuit diagram showing a DC/DC converter 200a according to a third embodiment. The DC/DC converter 200a further includes a second protection circuit 360 in addition to the configuration of the DC/DC converter 200 shown in FIG. 12. The second protection circuit 360 detects a switching-incapable state in which the synchronous rectification transistor M2 is not able to perform switching. Examples of such a switching-incapable state to be detected include: an open-circuit fault of the GATE pin of the secondary controller 400 (short-circuit fault between the gate and the source of the synchronous rectification transistor M2); and an open-circuit fault of the DRAIN pin.

Upon detecting the switching-incapable state, the second protection circuit 360 forcibly lowers the detection voltage $V_{OUTS}$ input to the feedback circuit 240 via the SH_IN pin of the secondary controller 400.

The first protection circuit 260 built into the secondary controller 400 is configured as an overvoltage protection circuit described in the second embodiment. The secondary controller 400a may have the same configuration as that of the secondary controller 400 shown in FIG. 14.

Figure 16:
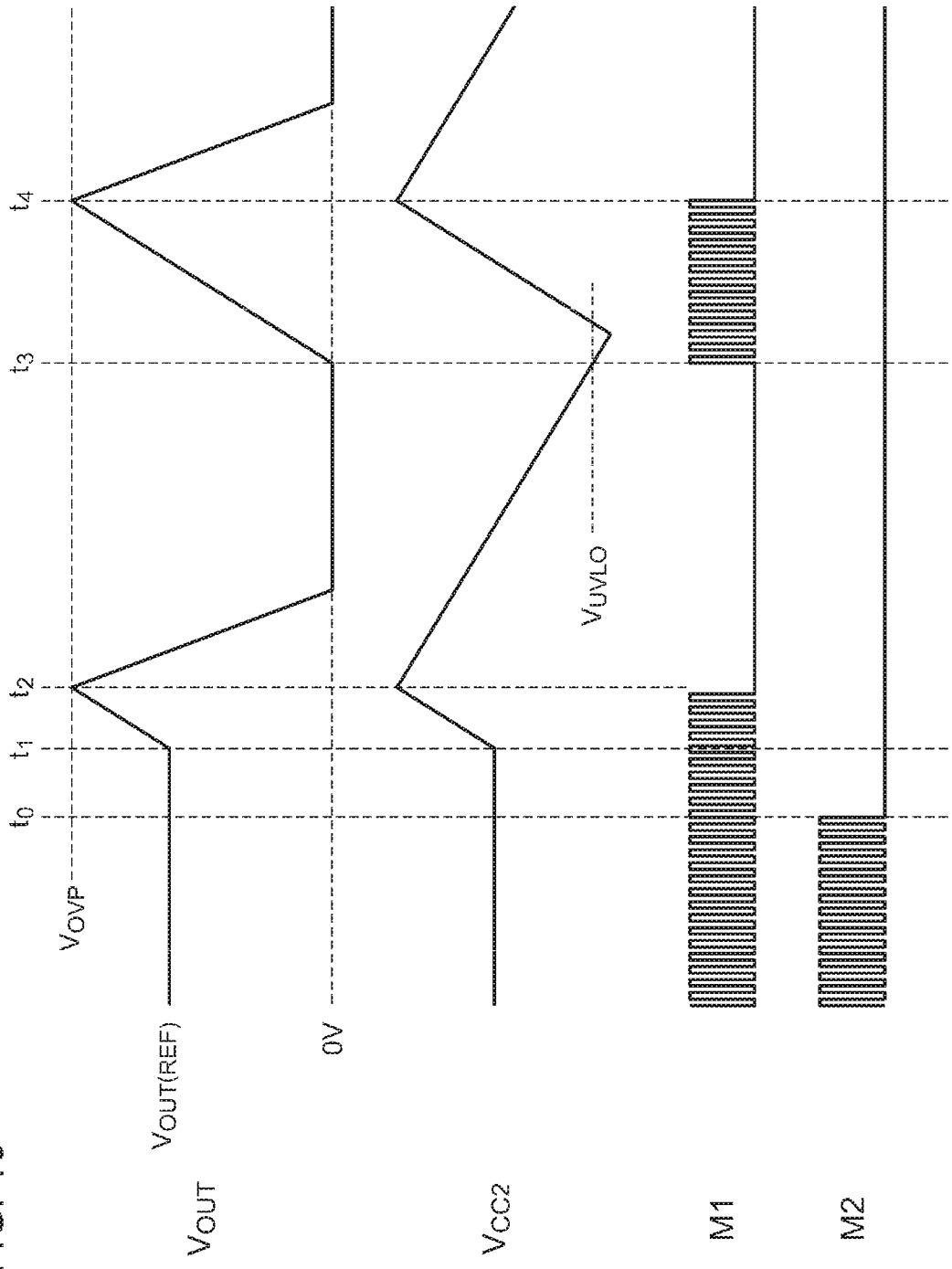
FIG. 16 is an operation waveform diagram showing the operation of the DC/DC converter shown in FIG. 15 in the switching-incapable state.

The above is the configuration of the DC/DC converter 200a. Next, description will be made with reference to FIG. 16 regarding the operation thereof. FIG. 16 is an operation waveform diagram showing the operation of the DC/DC converter 200a shown in FIG. 15 in the switching-incapable state.

In the normal state before the time point $t_0$, the switching transistor M1 and the synchronous rectification transistor M2 operate in a synchronous rectification mode in which they alternately turn on. The output voltage $V_{OUT}$ is stabilized to the target voltage $V_{OUT(REF)}$.

At the time point $t_0$, an open-circuit fault occurs at the GATE pin, for example, and it becomes impossible for the synchronous rectification transistor M2 to perform switching. In this case, the synchronous rectification transistor M2 is turned off, and the DC/DC converter 200a operates in the diode rectification mode.

When the second protection circuit 360 detects a switching-incapable state at the time point $t_1$, the voltage $V_{OUTS}$ at the SH_IN pin is forcibly lowered. This reduces the driving current $I_{ERR}$ supplied by the feedback circuit 240 to the photocoupler 204, and accordingly, the feedback signal $V_{FB}$ rises, thereby increasing the duty ratio of the switching of the switching transistor. As a result, the output voltage $V_{OUT}$ starts to rise. That is to say, upon detecting a switching-incapable state, the second protection circuit 360 intentionally generates an overvoltage state.

Eventually, when the output voltage $V_{OUT}$ exceeds the overvoltage threshold value $V_{OVP}$ at the time point $t_2$, the first protection circuit 260 performs a protection operation so as to suspend the switching of the switching transistor M1.

Subsequently, the auxiliary power supply voltage $V_{CC2}$ falls according to a reduction in the output voltage $V_{OUT}$. Eventually, when the auxiliary power supply voltage $V_{CC}$ becomes lower than the threshold value $V_{UVLO}$ at the time point $t_3$, the set state of the first protection circuit 260 is reset. This restarts the switching of the switching transistor M1, thereby increasing the output voltage $V_{OUT}$ again. Subsequently, when the second protection circuit 360 detects a switching-incapable state, an overvoltage state is intentionally generated again, which causes the output voltage $V_{OUT}$ to rise beyond the target value $V_{OUT(REF)}$. When the output voltage $V_{OUT}$ reaches the threshold value $V_{OVP}$ at the time point $t_4$, the overvoltage protection is executed again, which suspends the switching of the switching transistor M1.

The above is the operation of the DC/DC converter 200a.

As described above, if a switching-incapable state has occurred in the synchronous rectification transistor M2, a sequence of raising the output voltage $V_{OUT}$, overvoltage protection, suspending the switching of the switching transistor M1, and restarting the switching of the switching transistor M1 is repeatedly performed. In the switching-incapable state, the DC/DC converter 200a operates in the diode rectification mode using the body diode of the synchronous rectification transistor M2, which involves marked generation of heat in the synchronous rectification transistor M2. The secondary controller 400 supports a long suspension time in the intermittent operation, thereby suppressing an increase in the temperature of the synchronous rectification transistor M2.

Figure 17:
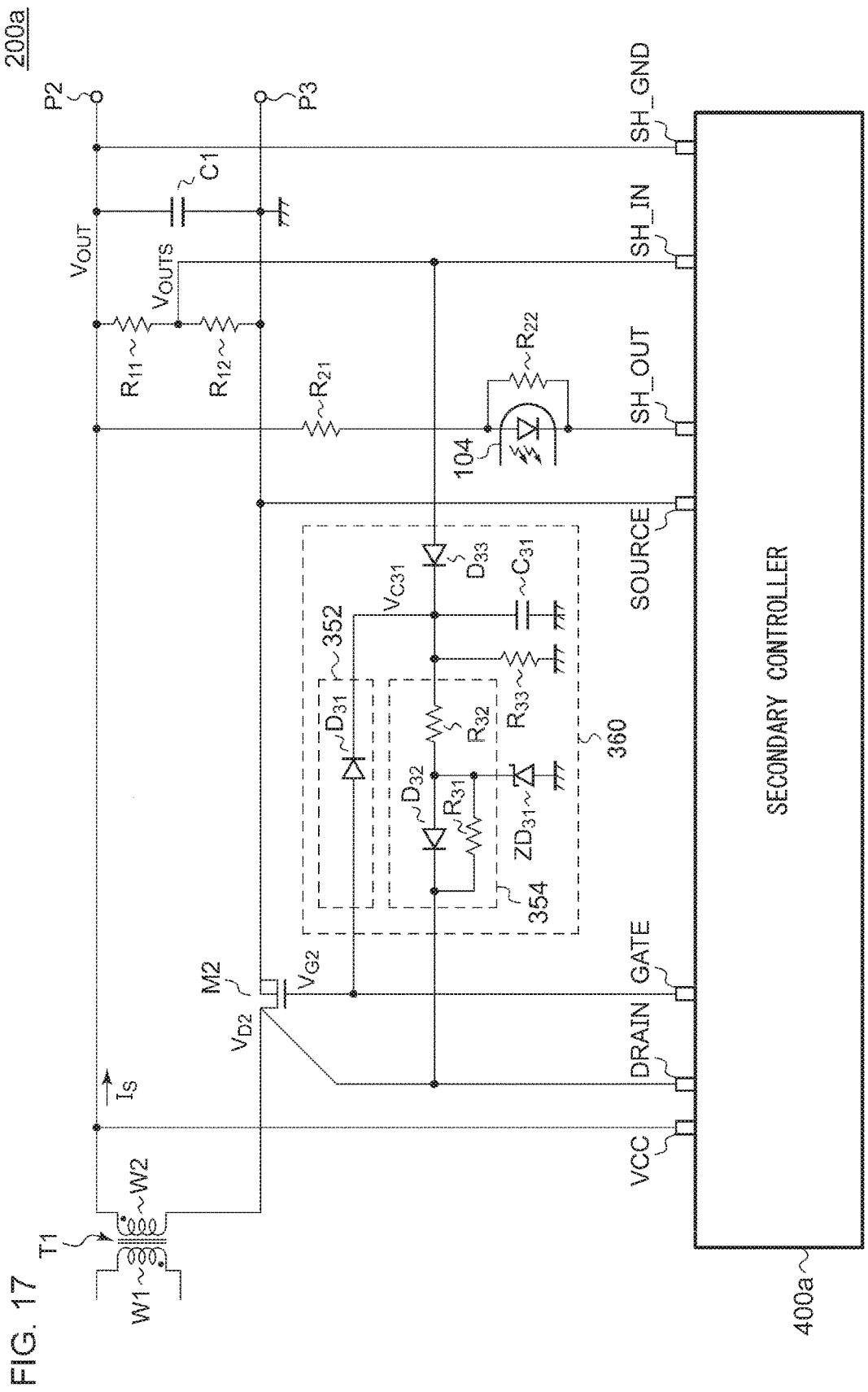
FIG. 17 is a circuit diagram showing an example configuration of the DC/DC converter shown in FIG. 16.

FIG. 17 is a circuit diagram showing an example configuration of the DC/DC converter 200a shown in FIG. 16. The second protection circuit 360 is arranged as an external circuit of the secondary controller 400 (synchronous rectification controller 300), and is coupled to the gate electrode of the synchronous rectification transistor M2. When a pulse does not occur at the gate electrode, the second protection circuit 360 judges that the GATE pin of the synchronous rectification controller 300 is in an electrical open-circuit state (gate open-circuit fault).

Upon detecting a gate open-circuit fault, the second protection circuit 360 controls other circuits so as to suspend the switching of the switching transistor M1 controlled by the primary controller 202. Specifically, upon detecting a gate open-circuit fault, the second protection circuit 360 forcibly lowers the voltage (detection voltage $V_{OUTS}$) at the SH_IN pin of the feedback circuit 206.

Here, in a light load range in which the current $I_S$ on the secondary side is small, even if the DC/DC converter 200a operates in the diode rectification mode, a current that flows through the body diode D2 of the synchronous rectification transistor M2 is small. This leads to only a small amount of heat generation, which does not become a problem.

Also, in order to provide improved efficiency, there are known DC/DC converters configured to intentionally operate in the diode rectification mode in such a light load range instead of performing the switching of the synchronous rectification transistor M2. Such an intentional diode rectification mode will also be referred to as the "sleep mode". In the sleep mode, no pulse occurs at the gate electrode of the synchronous rectification transistor M2.

In such a situation, in some cases, the switching of the switching transistor M1 is not preferably suspended even if a gate-open fault has occurred in the light load state (a state in which the output electric power is lower than a predetermined threshold value, or a state in which the output electric power is included within a predetermined electric power range). Accordingly, the second protection circuit 360 shown in FIG. 17 is configured such that the detection voltage $V_{OUTS}$ at the SH_IN pin is not lowered in the light load state. This supports both the operation in the sleep mode and protection when there is a gate open-circuit fault. Alternatively, even in a case in which the sleep mode operation is not supported, such an arrangement allows the DC/DC converter 200a to continue its operation in a range in which heat generation of the synchronous rectification transistor M2 does not become a problem. This allows the DC/DC converter 200a to continuously supply electric power to a load.

In the light load state, the low-level period of the cyclic signal $V_{D2}$ that occurs at the drain electrode of the synchronous rectification transistor M2 becomes short. Accordingly, the second protection circuit 360 is configured such that, when the low-level period of the cyclic signal $V_{D2}$ is short, the detection voltage $V_{OUTS}$ at the SH_IN pin is not lowered.

The second protection circuit 360 includes a capacitor $C_{31}$, a first path 352, and a second path 354. The first path 352 charges the capacitor C1 using the voltage $V_{G2}$ at the gate electrode. The first path 352 includes a diode $D_{31}$. It can be assumed that the combination of the diode $D_{31}$ and the capacitor $C_{31}$ is equivalent to a peak hold circuit.

The second path 354 is configured to charge and to discharge the capacitor $C_{31}$ using the voltage $V_{D2}$ at the drain electrode of the synchronous rectification transistor M2. The diode $D_{32}$ forms a discharging path when the cyclic signal $V_{D2}$ is set to the low level. The resistor $R_{31}$ forms a charging path when the cyclic signal $V_{D2}$ is set to the high level. Also, a resistor $R_{32}$ may be arranged on a common path shared by the charging path and the discharging path. By providing the resistor $R_{32}$, the charging/discharging rate of the second path 354 is lower than the charging rate of the first path 352. In some cases, the cyclic signal $V_{D2}$ exceeds 100 V. In order to protect the circuit, a Zener diode $ZD_{31}$ is provided. A resistor $R_{33}$ is arranged in parallel with the capacitor $C_{31}$, so as to form a discharging path to the ground.

The second protection circuit 360 changes the detection voltage $V_{OUTS}$ according to the voltage $V_{C31}$ across the capacitor $C_{31}$. The cathode of the diode $D_{33}$ is coupled to the capacitor $C_{31}$, and the anode thereof is coupled to the SH_IN terminal. It can be assumed that the second protection circuit 360 is equivalent to a clamp circuit that limits the detection voltage $V_{OUTS}$ at the SH_IN pin such that it does not exceed an upper limit value ($V_{C31}+V_F$) determined according to the voltage $V_{C31}$. Here, $V_F$ represents the forward voltage of the diode $D_{33}$. Also, instead of the diode $D_{33}$, a bipolar transistor or otherwise an FET may be arranged such that its emitter (source) is coupled to the SH_OUT pin and the voltage $V_{C31}$ is input to its base (gate).

Next, description will be made regarding the operation of the second protection circuit 360. For ease of understanding, description will be made ignoring the cyclic signal at the drain electrode. When a pulse occurs at the gate of the synchronous rectification transistor M2, the voltage $V_{C31}$ (e.g., 3 V) obtained by holding the peak of the gate pulse develops across the capacitor $C_{31}$. In a case in which the reference voltage $V_{REF}$ is 0.8 V, the voltage $V_{OUTS}$ at the SH_IN pin is stabilized in the vicinity of the reference voltage $V_{REF}$. Accordingly, the relation $V_{OUT}<V_{C31}+V_F$ holds true. In this case, the second protection circuit 360 does not control the detection voltage $V_{OUTS}$.

When no pulse is generated at the gate of the synchronous rectification transistor M2, the capacitor $C_{31}$ is not charged, and accordingly, the voltage $V_{C31}$ falls to the vicinity of zero (0 V). As a result, $V_{OUTS}$ is clamped to the upper limit value $V_F$, i.e., is forcibly lowered to the upper limit value $V_F$.

Next, description will be made regarding the relation between the cyclic signal $V_{D2}$ at the drain electrode and the voltage $V_{C31}$ across the capacitor $C_{31}$. It should be noted that a cyclic signal is generated at the drain electrode regardless whether or not a gate open-circuit fault has occurred. The charging rate provided by the second path 354 is determined by the resistor $R_{31}$, and discharging rate thereof is determined by the diode $D_{32}$. With such an arrangement, the discharging rate is higher than the charging rate.

Figure 18A:
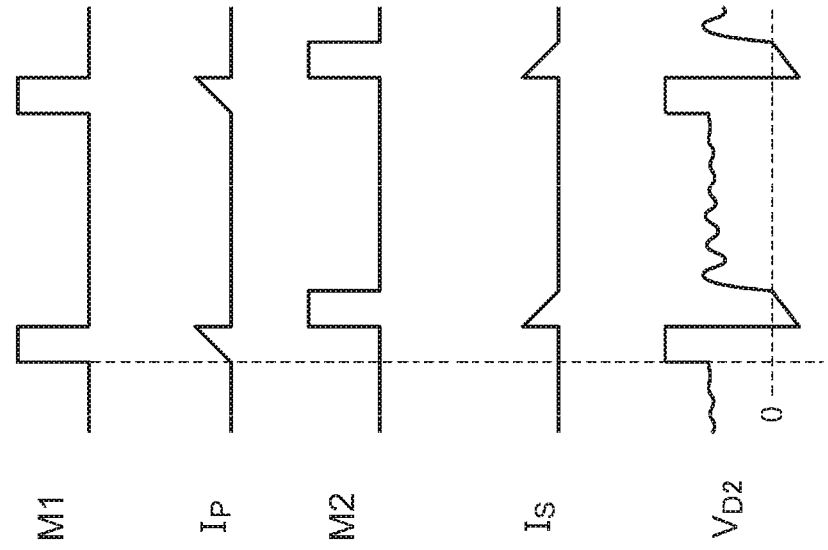
FIGS. 18A and 18B are operation waveform diagrams showing, respectively, the operation of the DC/DC converter in a heavy load state and in a light load state.
Figure 18B:
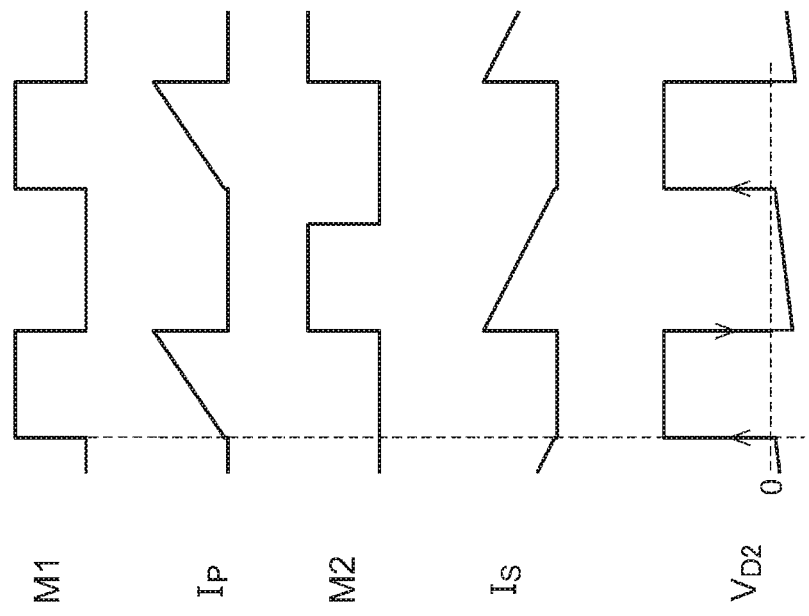

FIGS. 18A and 18B are operation waveform diagrams respectively showing the operations of the DC/DC converter 200a in a heavy load state and in a light load state. During a period in which the secondary-side current $I_S$ flows, the cyclic signal $V_{D2}$ is set to the low level for both of the heavy load state and the light load state. The capacitor C $C_{31}$ is charged in a period in which the cyclic signal $V_{D2}$ is set to the high level, i.e., when the secondary-side current $I_S$ does not flow. Conversely, the capacitor $C_{31}$ is discharged in a period in which the cyclic signal $V_{D2}$ is set to the low level, i.e., when the secondary-side current $I_S$ flows.

The low-level time of the cyclic signal $V_{D2}$ in the light load state is shorter than that in the heavy load state. Accordingly, the time ratio of the low level with respect to the high level in the light load state is lower than that in the heavy load state. As a result, in the heavy load state shown in FIG. 18A, the discharging in the low level is dominant, and accordingly, the second path 354 lowers the voltage $V_{C31}$ across the capacitor $C_{31}$. In contrast, in the light load state shown in FIG. 18B, the charging in the high level is dominant, and accordingly, the second path 354 does not lower the voltage $V_{C31}$ across the capacitor $C_{31}$.

It can be understood that the second protection circuit 360 shown in FIG. 17 corrects, based on the duty ratio of the cyclic signal $V_{D2}$, the output voltage $V_{C31}$ of the peak hold circuit including the first path 352 and the capacitor $C_{31}$.

In summary, the voltage $V_{C31}$ across the capacitor $C_{31}$ changes as follows.

(1) When the gate operates normally in the heavy load state, the voltage $V_{C31}$ rises.

(2) When the gate operates normally in the light load state, the voltage $V_{C31}$ rises.

(3) When there is a gate-open fault in the heavy load state, the voltage $V_{C31}$ falls.

(4) When there is a gate-open fault in the light load state, the voltage $VC_{31}$ rises.

As described above, with the second protection circuit 360 shown in FIG. 17, when a gate-open fault has occurred in the heavy load state, the detection voltage $V_{OUTS}$ is lowered, thereby providing circuit protection.

It should be noted that, in a case in which such a circuit protection is to be executed when there is a gate-open fault in the light load state, the second path 354 may preferably be omitted.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made in the embodiment regarding an arrangement in which the synchronous rectification transistor M2 is arranged on a lower electric potential side than that of the secondary winding W2. Also, the synchronous rectification transistor M2 may be arranged on a higher electric potential side, i.e., may be arranged between the secondary winding W2 and the output terminal P2.

Description has been made in the embodiment regarding a flyback converter as an example. Also, the present invention is applicable to an LLC converter.

[Usage]

Figure 19:
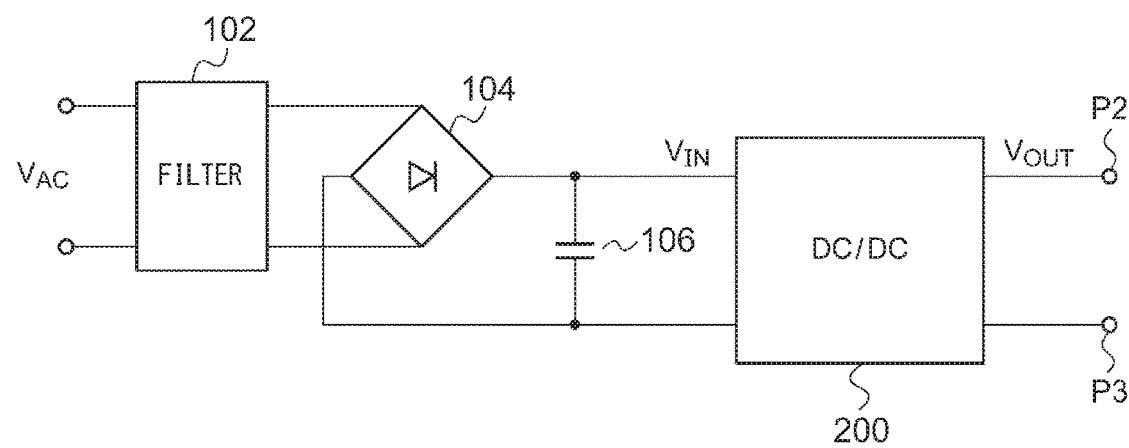
FIG. 19 is a circuit diagram showing an AC/DC converter including a DC/DC converter.

Next, description will be made regarding the usage of the DC/DC converter 200 described in the embodiment. The DC/DC converter 200 may be employed in an AC/DC converter 100. FIG. 19 is a circuit diagram showing the AC/DC converter 100 including the DC/DC converter 200.

The AC/DC converter 100 includes a filter 102, a rectifier circuit 104, a smoothing capacitor 106, and the DC/DC converter 200. The filter 102 removes the noise of the AC voltage VAC. The rectifier circuit 104 is configured as a diode bridge circuit that performs full-wave rectification of the AC voltage $V_{AC}$. The smoothing capacitor 106 smoothes the voltage thus subjected to full-wave rectification, so as to generate a DC voltage $V_{IN}$. The DC/DC converter 200 receives the DC voltage $V_{IN}$, and generates an output voltage $V_{OUT}$.

Figure 20:
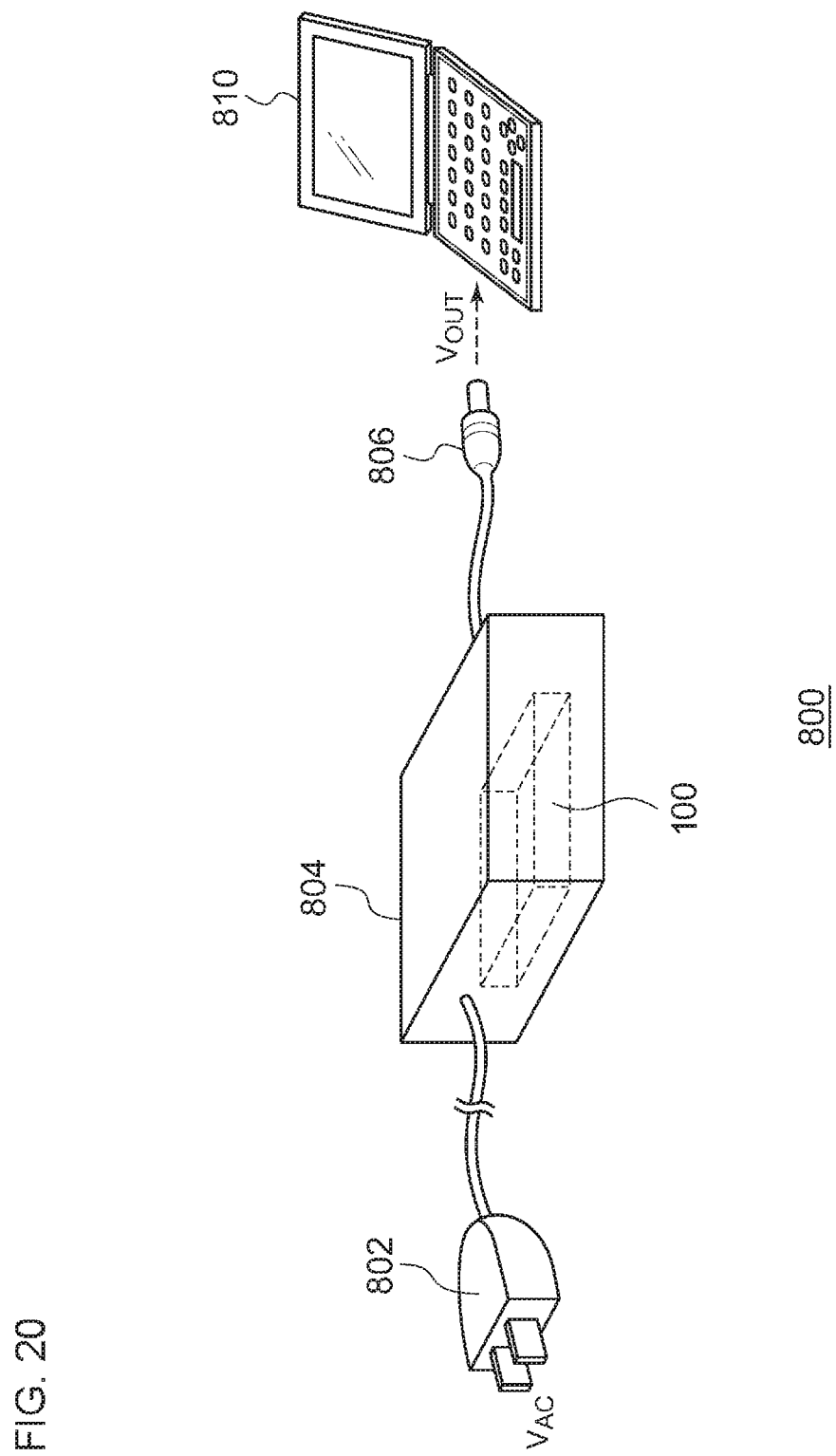
FIG. 20 is a diagram showing an AC adapter including an AC/DC converter.

FIG. 20 is a diagram showing an AC adapter 800 including the AC/DC converter 100. The AC adapter 800 includes a plug 802, a housing 804, and a connector 806. The plug 802 receives a commercial AC voltage $V_{AC}$ from an unshown electrical outlet. The AC/DC converter 100 is mounted within the housing 804. The DC output voltage $V_{OUT}$ generated by the AC/DC converter 100 is supplied from the connector 806 to an electronic device 810. Examples of such an electronic device 810 include laptop computers, digital still cameras, digital video cameras, cellular phones, portable audio players, and the like.

Figure 21A:
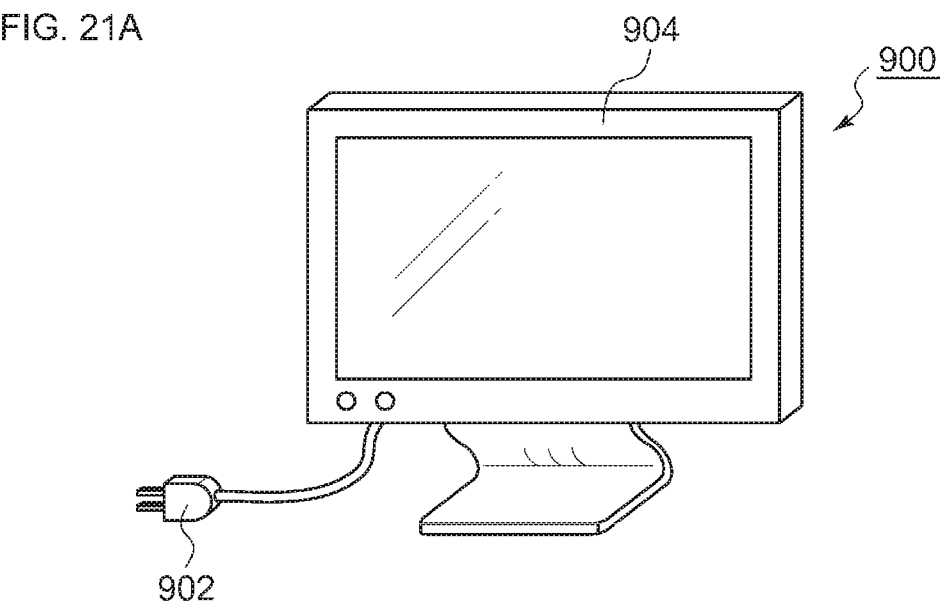
FIGS. 21A and 21B are diagrams each showing an electronic device including an AC/DC converter.
Figure 21B:
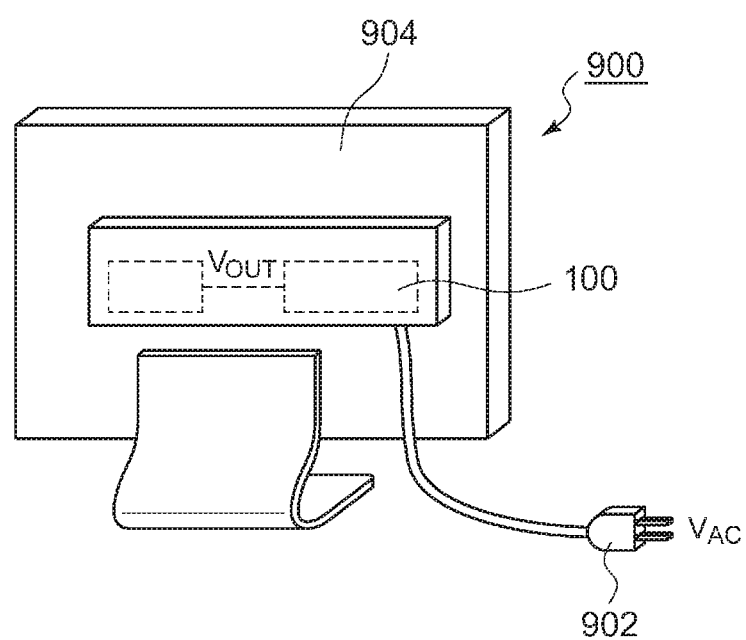

FIGS. 21A and 21B are diagrams each showing an electronic device 900 including the AC/DC converter 100. The electronic devices 900 shown in FIGS. 21A and 21B are each configured as a display apparatus. However, the electronic device 900 is not particularly restricted in kind, as long as it includes a power supply apparatus as an internal component. Examples of such an electronic device 900 include audio devices, refrigerators, washing machines, vacuum cleaners, etc.

A plug 902 receives commercial AC voltage $V_{AC}$ from an unshown electrical outlet. The AC/DC converter 100 is mounted within the housing 904. The DC output voltage $V_{OUT}$ generated by the AC/DC converter 100 is supplied to loads mounted within the same housing 904, examples of which include a microcomputer, DSP (Digital Signal Processor), power supply circuit, illumination device, analog circuit, digital circuit, etc.

While the preferred embodiments of the present invention have been described using specific terms, such description is for illustrative purposes only, and it is to be understood that changes and variations may be made without departing from the spirit or scope of the appended claims.

What is claimed is:

1. A synchronous rectification controller structured to control a synchronous rectification transistor of an insulated synchronous rectification DC/DC converter, the synchronous rectification controller comprising:
    a drain pin structured to receive a drain voltage of the synchronous rectification transistor;
    a pulse generator structured to generate a pulse signal based on a voltage at the drain pin;
    a driver structured to drive the synchronous rectification transistor based on the pulse signal; and
    an abnormality detection circuit structured to assert an abnormality detection signal when an open-circuit fault of the drain pin is detected,
    wherein the abnormality detection circuit is structured such that, when no cyclic signal occurs at the drain pin, and when the DC/DC converter generates an output voltage, the abnormality detection signal is asserted,
    and wherein the DC/DC converter comprises:
    a photocoupler comprising a light-emitting element and a light-receiving element;
    a feedback circuit structured to drive the light-emitting element of the photocoupler such that the output voltage of the DC/DC converter approaches a target voltage; and
    a primary controller coupled to the light-receiving element of the photocoupler, and structured to perform switching of a switching transistor according to a feedback signal received from the light-receiving element,
    and wherein the abnormality detection circuit judges, based on a current that flows through the light-emitting element, whether or not the DC/DC converter has generated the output voltage.

2. The synchronous rectification controller according to claim 1, wherein the abnormality detection circuit comprises a comparator structured to compare a detection voltage that corresponds to the output voltage of the DC/DC converter with a predetermined threshold voltage.

3. The synchronous rectification controller according to claim 1, wherein the feedback circuit comprises:
    an error amplifier structured to amplify a difference between a detection voltage that corresponds to the output voltage of the DC/DC converter and a target voltage; and
    a first transistor comprising a control terminal coupled to an output terminal of the error amplifier, and arranged on the same current path as the light-emitting element,
    wherein the abnormality detection circuit comprises a second transistor coupled with the first transistor so as to form a current mirror circuit, and wherein the abnormality detection circuit judges, based on a current that flows through the second transistor, whether or not the output voltage is generated by the DC/DC converter.

4. The synchronous rectification controller according to claim 1, wherein the DC/DC converter is configured as an LLC converter, and comprising two synchronous rectification transistors on a secondary side thereof,
wherein the synchronous rectification controller includes two drain pins structured to respectively receive drain voltages of the two synchronous rectification transistors,
and wherein, when a cyclic signal occurs at either one from among the two drain pins, and when a cyclic signal does not occur at the other drain pin, the abnormality detection circuit judges that an open-circuit fault has occurred.

5. The synchronous rectification controller according to claim 1, wherein the DC/DC converter comprises:
a photocoupler comprising a light-emitting element and a light-receiving element;
a feedback circuit structured to drive the light-emitting element of the photocoupler such that an output voltage of the DC/DC converter approaches a target voltage; and
a primary controller coupled to the light-receiving element, and structured to perform switching of a switching transistor according to a feedback signal received from the light-receiving element,
and wherein the abnormality detection circuit is structured to drive the light-emitting element of the photocoupler in response to an assertion of the abnormality detection signal.

6. A synchronous rectification controller structured to control a synchronous rectification transistor of an insulated synchronous rectification DC/DC converter, the synchronous rectification controller comprising:
a drain pin structured to receive a drain voltage of the synchronous rectification transistor;
a pulse generator structured to generate a pulse signal based on a voltage at the drain pin;
a driver structured to drive the synchronous rectification transistor based on the pulse signal; and
an abnormality detection circuit structured to assert an abnormality detection signal when an open-circuit fault of the drain pin is detected,
wherein the DC/DC converter comprises:
a photocoupler comprising a light-emitting element and a light-receiving element;
a feedback circuit structured to drive the light-emitting element of the photocoupler such that an output voltage of the DC/DC converter approaches a target voltage; and
a primary controller coupled to the light-receiving element, and structured to perform switching of a switching transistor according to a feedback signal received from the light-receiving element,
and wherein the abnormality detection circuit is structured to drive the light-emitting element of the photocoupler in response to an assertion of the abnormality detection signal,
wherein the feedback circuit comprises:
an error amplifier structured to amplify a difference between a detection voltage that corresponds to the output voltage of the DC/DC converter and a target voltage thereof; and
a first transistor having a control terminal coupled to an output terminal of the error amplifier, and arranged on the same current path as the light-emitting element,
and wherein the abnormality detection circuit comprises a third transistor arranged in parallel with the first transistor and structured to turn on the third transistor according to the assertion of the abnormality detection signal.

7. The synchronous rectification controller according to claim 6, wherein the feedback circuit is housed in the same package as the synchronous rectification controller.

8. The synchronous rectification controller according to claim 1, wherein the DC/DC converter comprises:
a first photocoupler comprising a first light-emitting element and a first light-receiving element;
a feedback circuit structured to drive the first light-emitting element such that an output voltage of the DC/DC converter approaches a target voltage;
a primary controller coupled to the first light-receiving element, and structured to perform switching of a switching transistor according to a feedback signal received from the first light-receiving element; and
a second photocoupler comprising a second light-emitting element and a second light-receiving element,
wherein the abnormality detection circuit drives the second light-emitting element in response to the assertion of the abnormality detection signal,
and wherein the primary controller is structured to suspend the switching of the switching transistor or otherwise to reduce an on time thereof based on a current that flows through the second light-receiving element.

9. The synchronous rectification controller according to claim 1, monolithically integrated on a single semiconductor substrate.

10. The synchronous rectification controller according to claim 1, wherein the DC/DC converter is configured as a flyback converter.

11. The synchronous rectification controller according to claim 1, wherein the DC/DC converter is configured as an LLC converter.

12. A DC/DC converter comprising the synchronous rectification controller according to claim 1.

13. An electronic device comprising:
a load;
a diode rectification circuit structured to perform full-wave rectification of a commercial AC voltage;
a smoothing capacitor structured to smooth an output voltage of the diode rectification circuit, so as to generate a DC input voltage; and
the DC/DC converter according to claim 12, structured to step down the DC input voltage, and to supply the DC input voltage thus stepped down to the load.

14. A power supply adapter comprising:
a diode rectification circuit structured to perform full-wave rectification of a commercial AC voltage;
a smoothing capacitor structured to smooth an output voltage of the diode rectification circuit, so as to generate a DC input voltage; and
the DC/DC converter according to claim 12, structured to step down the DC input voltage, and to supply the DC input voltage thus stepped down to a load.

15. A synchronous rectification controller structured to control a synchronous rectification transistor of an insulated synchronous rectification DC/DC converter, the synchronous rectification controller comprising:
a drain pin structured to receive a drain voltage of the synchronous rectification transistor;

a pulse generator structured to generate a pulse signal based on a voltage at the drain pin;

a driver structured to drive the synchronous rectification transistor based on the pulse signal; and an abnormality detection circuit structured to assert an abnormality detection signal when an open-circuit fault of the drain pin is detected, wherein the abnormality detection circuit is structured such that, when the pulse signal is maintained at a constant value, and when the DC/DC converter generates an output voltage, the abnormality detection signal is asserted, and wherein the DC/DC converter comprises:

a photocoupler comprising a light-emitting element and a light-receiving element;

a feedback circuit structured to drive the light-emitting element of the photocoupler such that the output voltage of the DC/DC converter approaches a target voltage; and a primary controller coupled to the light-receiving element of the photocoupler, and structured to perform switching of a switching transistor according to a feedback signal received from the light-receiving element, and wherein the abnormality detection circuit judges, based on a current that flows through the light-emitting element, whether or not the DC/DC converter has generated the output voltage.

16. The synchronous rectification controller according to claim 15, wherein the abnormality detection circuit comprises a comparator structured to compare a detection voltage that corresponds to the output voltage of the DC/DC converter with a predetermined threshold voltage.

17. The synchronous rectification controller according to claim 15, wherein the feedback circuit comprises:

an error amplifier structured to amplify a difference between a detection voltage that corresponds to the output voltage of the DC/DC converter and a target voltage; and a first transistor comprising a control terminal coupled to an output terminal of the error amplifier, and arranged on the same current path as the light-emitting element, wherein the abnormality detection circuit comprises a second transistor coupled with the first transistor so as to form a current mirror circuit, and wherein the abnormality detection circuit judges, based on a current that flows through the second transistor, whether or not the output voltage is generated by the DC/DC converter.

18. The synchronous rectification controller according to claim 15, wherein the DC/DC converter is configured as an LLC converter, and comprising two synchronous rectification transistors on a secondary side thereof, wherein the synchronous rectification controller includes two drain pins structured to respectively receive drain voltages of the two synchronous rectification transistors, and wherein, when a cyclic signal occurs at either one from among the two drain pins, and when a cyclic signal does not occur at the other drain pin, the abnormality detection circuit judges that an open-circuit fault has occurred.

19. The synchronous rectification controller according to claim 15, wherein the DC/DC converter comprises:

a first photocoupler comprising a first light-emitting element and a first light-receiving element;

a feedback circuit structured to drive the first light-emitting element such that an output voltage of the DC/DC converter approaches a target voltage;

a primary controller coupled to the first light-receiving element, and structured to perform switching of a switching transistor according to a feedback signal received from the first light-receiving element; and a second photocoupler comprising a second light-emitting element and a second light-receiving element, wherein the abnormality detection circuit drives the second light-emitting element in response to the assertion of the abnormality detection signal, and wherein the primary controller is structured to suspend the switching of the switching transistor or otherwise to reduce an on time thereof based on a current that flows through the second light-receiving element.

20. A DC/DC converter comprising the synchronous rectification controller according to claim 15.

21. An electronic device comprising:

a load;

a diode rectification circuit structured to perform full-wave rectification of a commercial AC voltage;

a smoothing capacitor structured to smooth an output voltage of the diode rectification circuit, so as to generate a DC input voltage; and the DC/DC converter according to claim 20, structured to step down the DC input voltage, and to supply the DC input voltage thus stepped down to the load.

22. A power supply adapter comprising:

a diode rectification circuit structured to perform full-wave rectification of a commercial AC voltage;

a smoothing capacitor structured to smooth an output voltage of the diode rectification circuit, so as to generate a DC input voltage; and the DC/DC converter according to claim 20, structured to step down the DC input voltage, and to supply the DC input voltage thus stepped down to a load.

* * * * *